(12) United States Patent
Yamanaka et al.

(10) Patent No.: US 7,983,289 B2
(45) Date of Patent: Jul. 19, 2011

(54) COMMUNICATION APPARATUS AND RECORDING MEDIUM

(75) Inventors: Shigeyuki Yamanaka, Tenri (JP); Yusuke Yamada, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 249 days.

(21) Appl. No.: 11/932,956

(22) Filed: Oct. 31, 2007

(65) Prior Publication Data

US 2008/0107221 A1    May 8, 2008

(30) Foreign Application Priority Data

Nov. 7, 2006   (JP) .................................. 2006-301872

(51) Int. Cl.
*H04L 12/54* (2006.01)
*H04J 3/06* (2006.01)
*H04J 3/00* (2006.01)
*H04L 7/00* (2006.01)
*H04L 1/18* (2006.01)
*G06F 11/00* (2006.01)
*G08C 25/02* (2006.01)

(52) U.S. Cl. ........ 370/428; 370/503; 370/521; 375/371; 714/18; 714/748

(58) Field of Classification Search ........................ None
See application file for complete search history.

(56) References Cited

U.S. PATENT DOCUMENTS

| | | | | |
|---|---|---|---|---|
| 5,383,185 A | * | 1/1995 | Armbruster et al. | 370/447 |
| 5,392,280 A | * | 2/1995 | Zheng | 370/353 |
| 5,713,028 A | * | 1/1998 | Takahashi et al. | 713/322 |
| 5,935,267 A | * | 8/1999 | Hayakawa | 714/748 |
| 6,415,410 B1 | * | 7/2002 | Kanerva et al. | 714/749 |
| 6,430,192 B1 | * | 8/2002 | Creedon et al. | 370/428 |
| 6,446,232 B1 | * | 9/2002 | Chan et al. | 714/746 |
| 6,535,567 B1 | * | 3/2003 | Girardeau, Jr. | 375/372 |
| 6,728,240 B1 | * | 4/2004 | Dally et al. | 370/366 |
| 6,744,784 B1 | * | 6/2004 | Naka et al. | 370/476 |
| 7,035,894 B2 | * | 4/2006 | Park et al. | 709/200 |
| 7,079,554 B2 | * | 7/2006 | Peled | 370/514 |
| 7,349,331 B2 | * | 3/2008 | Lenzini et al. | 370/229 |
| 7,359,406 B2 | * | 4/2008 | Holloway et al. | 370/503 |
| 7,424,661 B2 | * | 9/2008 | Fujimoto | 714/749 |

(Continued)

FOREIGN PATENT DOCUMENTS

JP    2003-218842 A    7/2003

(Continued)

*Primary Examiner* — Seema S. Rao
*Assistant Examiner* — Xavier Szewai Wong
(74) *Attorney, Agent, or Firm* — Birch, Stewart, Kolasch & Birch, LLP

(57) ABSTRACT

A packet is transmitted such that jitter of a packet transmission time period is suppressed. A transmission apparatus includes a stream data obtaining unit obtaining stream data from a source outside of the transmission apparatus, a coding unit compressing and coding the stream data, a packet generation unit generating a packet, a transmission buffer unit temporarily storing data, a transmission method selection unit selecting any one of "jitter suppressed transmission" and "normal transmission" as a transmission mode, a communication I/F unit transmitting the packetized stream data with a transmission method selected by the transmission method selection unit, a communication medium detection unit obtaining data for controlling communication via the communication I/F unit by identifying a communication medium, a time keeping unit generating time information, an input unit accepting manipulation input, and a storage unit storing data in a non-volatile manner.

20 Claims, 9 Drawing Sheets

U.S. PATENT DOCUMENTS

| | | | |
|---|---|---|---|
| 7,447,968 B2 * | 11/2008 | Ha et al. | 714/748 |
| 2002/0075829 A1 * | 6/2002 | Sakoda | 370/332 |
| 2002/0112070 A1 * | 8/2002 | Ellerbrock et al. | 709/238 |
| 2003/0117997 A1 * | 6/2003 | Kim | 370/350 |
| 2005/0094667 A1 * | 5/2005 | Dahlman et al. | 370/473 |
| 2005/0111536 A1 * | 5/2005 | Cranford et al. | 375/226 |
| 2005/0186933 A1 * | 8/2005 | Trans | 455/296 |
| 2007/0091933 A1 * | 4/2007 | Chelstrom et al. | 370/503 |
| 2007/0201380 A1 * | 8/2007 | Ma et al. | 370/254 |
| 2008/0019272 A1 * | 1/2008 | Freeburg | 370/232 |

FOREIGN PATENT DOCUMENTS

| | | |
|---|---|---|
| JP | 2003-258894 A | 9/2003 |
| JP | 2004-7183 A | 1/2004 |
| JP | 2006-25112 A | 1/2006 |

\* cited by examiner

FIG.9

| PHY RATE | MODULATION TECHNIQUE | CODING RATIO |
|---|---|---|
| 6Mbps | BPSK | 1/2 |
| 9Mbps | BPSK | 3/4 |
| 12Mbps | QPSK | 1/2 |
| 18Mbps | QPSK | 3/4 |
| 24Mbps | 16QAM | 1/2 |
| 36Mbps | 16QAM | 3/4 |
| 48Mbps | 64QAM | 2/3 |
| 54Mbps | 64QAM | 3/4 |

FIG.11

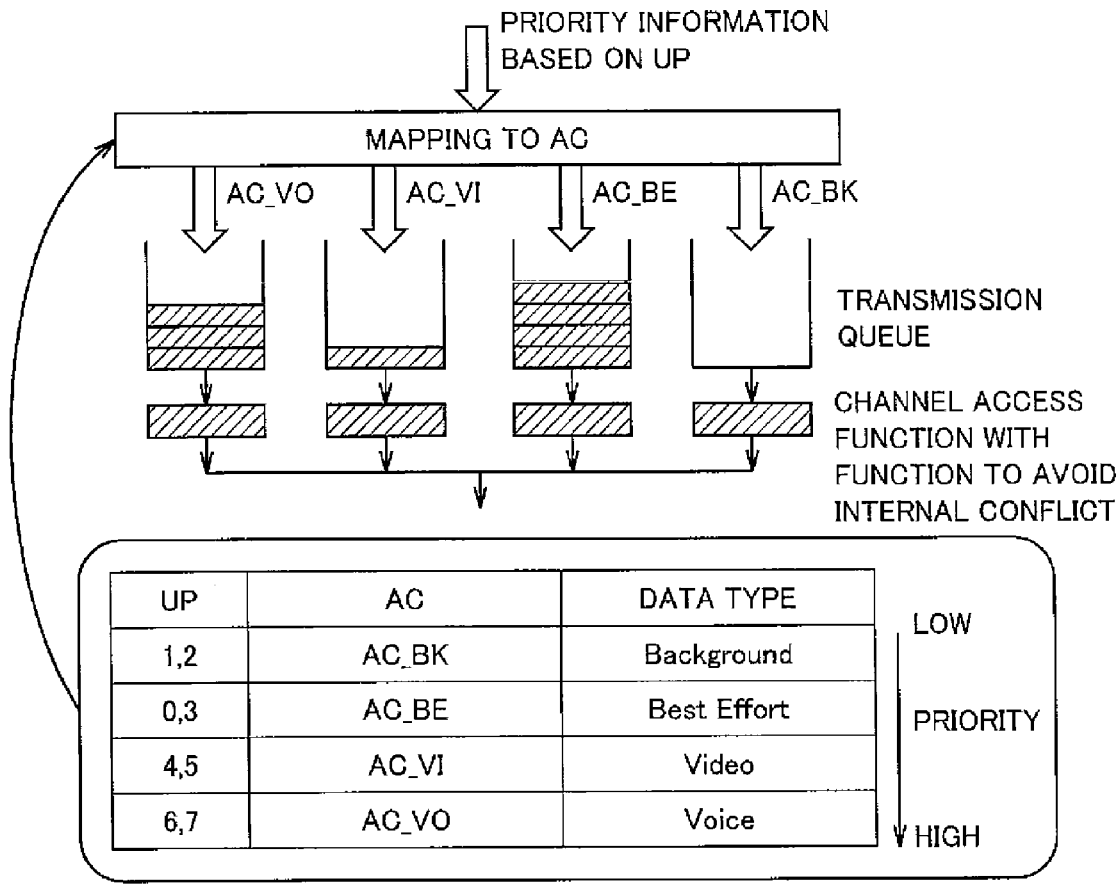

FIG.12

| PARAMETER | DESCRIPTION |
|---|---|
| Nominal MSDU Size | AVERAGE VALUE OF FRAME SIZE |
| Maximum MSDU Size | MAXIMUM VALUE OF FRAME SIZE |
| Inactivity Interval | LINK TIMEOUT VALUE |
| Mean Data Rate | AVERAGE VALUE OF DATA RATE |
| Minimum PHY Rate | MINIMUM VALUE OF PHYSICAL RATE |
| Delay Bound | ALLOWABLE DELAY TIME |
| Surplus Bandwidth Allowance | STANDARD BAND RATIO IN CONSIDERATION OF RE-SENDING OR THE LIKE |

COMMUNICATION APPARATUS AND RECORDING MEDIUM

This nonprovisional application is based on Japanese Patent Application No. 2006-301872 filed with the Japan Patent Office on Nov. 7, 2006, the entire contents of which are hereby incorporated by reference.

FIELD OF THE INVENTION

The present invention relates to data communication. More specifically, the present invention relates to a technique for transmission of stream data or the like via a communication path where a communication status in a transmission path significantly fluctuates such as wireless communication.

DESCRIPTION OF THE BACKGROUND ART

In recent years, a technique to establish communication of data such as video image via a network and reproduce the video image in real time while receiving such data has been put into practical use.

If system clocks of a transmission apparatus and a reception apparatus between which such data communication is established are not completely synchronous, difference in the system clock accumulates over time. Such accumulation of difference in the system clock over time results in a serious problem in real time video image transmission.

In real time video image transmission, in general, reproduction is started in the reception apparatus after data is buffered to some extent. If the system clock of the reception apparatus is earlier than the system clock of the transmission apparatus, an amount of video image data decoded in the reception apparatus becomes greater than an amount of video image data coded in the transmission apparatus. Accordingly, buffer in the reception apparatus gradually decreases, and finally underflow of the buffer occurs. In contrast, if the system clock of the reception apparatus is behind the system clock of the transmission apparatus, overflow of the buffer occurs. Overflow or underflow of the buffer in the reception apparatus results in necessity for buffering processing again of the data. Consequently, such a problem as temporary distortion of the video image or complete stop thereof is caused, leading to a factor impairing real time characteristics.

As a measure against such problems, a technique to synchronize a clock of the reception apparatus with a clock of the transmission apparatus by detecting to which extent the system clock of the reception apparatus deviates from the system clock of the transmission apparatus based on an amount of variation in the buffer in the reception apparatus or on variation in a packet transmission time period or the like has been developed. The buffer amount or the packet transmission time period, however, tends to fluctuate due to influence of a network between the transmission apparatus and the reception apparatus, and therefore, accurate synchronization control is difficult.

Synchronization control should thus be carried out in consideration of the influence of the network over which packets are transmitted. For example, Japanese Patent Laying-Open No. 2003-258894 discloses a method of eliminating influence of the network by smoothing a transmission time period for each packet with a low pass filter (LPF) and excluding the transmission time period that has significantly fluctuated due to the influence of the network. As variation in the packet transmission time period after the influence of the network has been eliminated exhibits monotonous decrease or monotonous increase due to difference in the system clock, based on that slope, synchronization of the system clock of the reception apparatus with the system clock of the transmission apparatus is facilitated.

In addition, Japanese Patent Laying-Open No. 2003-218842 discloses a technique, for eliminating the influence of the network, to find a relative maximum value and a relative minimum value of the packet transmission time period every prescribed time and to synchronize the system clock of the reception apparatus with the system clock of the transmission apparatus based on increase and decrease in the relative maximum value and the relative minimum value.

Jitter in the packet transmission time period appears more noticeably in a wireless network. One cause thereof includes, for example, frequent change in a physical rate in the wireless network in accordance with a communication environment. For example, Japanese Patent Laying-Open No. 2004-007183 discloses a method of radio transmission where a physical rate is fixed to 12 Mbps when video images are transmitted (SD (standard definition)) whereas the physical rate is varied when other types of data are transmitted.

In addition, Japanese Patent Laying-Open No. 2006-025112 discloses a method of transmission where a physical rate is fixed for real time data while the physical rate is varied for non-real-time data. In performing the synchronization method as described in Japanese Patent Laying-Open No. 2003-258894 or Japanese Patent Laying-Open No. 2003-218842, by transmitting specific data with the physical rate being fixed regardless of a communication environment as described in Japanese Patent Laying-Open No. 2004-007183 or Japanese Patent Laying-Open No. 2006-025112, jitter of the packet transmission time period due to variation in the physical rate can be prevented.

Monitoring increase and decrease in the packet transmission time period in order to synchronize system clocks in different systems of the transmission apparatus and the reception apparatus can be very effective means, as it can be realized with a simplified mechanism without a communication medium being limited. A greatest problem in such control, however, is that the packet transmission time period frequently jitters due to the influence of the network between the transmission apparatus and the reception apparatus.

In particular, in communication using wireless LAN (Local Area Network) complying with IEEE802.11a or the like, eight types of rates of a link between the transmission apparatus and the reception apparatus referred to as a physical rate can be set from 6 Mbps to 54 Mbps, and different physical rate brings about significantly different packet transmission time periods.

Referring to FIG. 10, difference in a packet transmission time period depending on a physical rate will be described. FIG. 10 illustrates a variation in a packet transmission time period actually measured in the reception apparatus when the physical rate is increased from 6 to 12, 18, and 24 Mbps for each second. It is seen from FIG. 10 that, if the physical rate is different, the packet transmission time period is significantly different. For example, when the physical rate changes from 6 Mbps to 12 Mbps, the packet transmission time period is shorter by approximately 300 μs. Therefore, in such a condition that the physical rate frequently varies, the packet transmission time period significantly jitters. By transmitting data at a constant physical rate without varying the physical rate, however, such jitter can be avoided.

Even if the physical rate is fixed, however, when a transmission packet where the time of transmission has been inserted in an upper layer of the transmission apparatus is not received by the reception apparatus but repeatedly re-sent through a MAC (Media Access Control) layer, the packet transmission time period significantly jitters. Where the packet is received by the reception apparatus after re-sending, the time of transmission still indicates the time at which the packet was first transmitted and it is not updated when it is re-sent. Therefore, the packet transmission time period has a value greater than when re-sending is not performed, by a time period spent for re-sending. Accordingly, even if the physical rate is fixed, the packet transmission time period significantly jitters depending on frequency of re-sending or the number of times of re-sending of the same packet.

In addition, in an example where the transmission apparatus includes a transmission buffer, due to frequent re-sending, all packets generated in the transmission apparatus are not successfully transmitted and such packets are accumulated in the transmission buffer. When a packet accumulated in the transmission buffer is transmitted, a waiting time in the transmission buffer is also included in the packet transmission time period, and therefore, the packet transmission time period further significantly jitters.

Moreover, in an example where a plurality of pieces of equipment establish communication, even in such a communication environment that the physical rate is fixed and re-sending is unlikely, a packet has to wait before transmission depending on congestion of communication. Therefore, the packet transmission time period jitters due to the waiting time.

Japanese Patent Laying-Open No. 2003-258894 and Japanese Patent Laying-Open No. 2003-218842 disclose a synchronization method capable of ignoring jitter of a packet transmission time period due to influence of a network. If a packet transmission time period is within a certain range and jitter is not significant, this method may be effective.

If the packet transmission time period significantly jitters as in jitter in the case of wireless LAN, according to the method of using a low pass filter in Japanese Patent Laying-Open No. 2003-258894, depending on a setting value of the low pass filter, such a condition that all packet transmission time periods are excluded by the low pass filter or the packet transmission time period obtained by the low pass filter still significantly jitters may occur.

Alternatively, according to the method of Japanese Patent Laying-Open No. 2003-218842, if such a condition that the physical rate frequently varies within a prescribed time period during which a relative maximum value and a relative minimum value of the packet transmission time period are measured occurs, the relative maximum value and the relative minimum value may vary in a direction different from a direction of difference in the system clock. Therefore, it is possible that the system clock of the reception apparatus is varied in such a manner that the difference from the system clock of the transmission apparatus is greater.

In addition, use of such a method that the transmission apparatus transmits data with the physical rate being fixed as disclosed in Japanese Patent Laying-Open No. 2004-007183 or Japanese Patent Laying-Open No. 2006-025112 can suppress jitter of the packet transmission time period to some extent. Depending on frequency of re-sending, a waiting time in the buffer, and congestion of communication, however, the packet transmission time period may jitter, which is not satisfactory.

The present invention was made to solve the above-described problems. An object of the present invention is to provide a communication apparatus transmitting a packet with a method capable of suppressing occurrence of jitter of a packet transmission time period measured in a reception apparatus, such that the reception apparatus accurately synchronizes a system clock thereof with a system clock of a transmission apparatus.

Another object of the present invention is to provide a recording medium storing a program for causing a computer to function as a communication apparatus transmitting a packet while suppressing occurrence of jitter of a packet transmission time period measured in a reception apparatus.

SUMMARY OF THE INVENTION

In summary, in order to achieve the above-described object, according to one aspect of the present invention, a communication apparatus communicating with a reception apparatus connected to a network is provided. The reception apparatus includes a first clock. The communication apparatus includes a plurality of transmission modes realizing communication with the reception apparatus. The plurality of transmission modes include a first transmission mode defined in advance as a standard mode of transmission by the communication apparatus and a second transmission mode different from the first transmission mode. The communication apparatus includes: a transmission buffer unit configured to store a packet, a second clock; a determination unit configured to determine whether synchronization of the first clock with the second clock has ended; a selection unit configured to select one transmission mode from the plurality of transmission modes in accordance with a result of determination by the determination unit; and a transmission unit configured to transmit the packet stored in the transmission buffer unit to the reception apparatus based on the transmission mode selected by the selection unit. The selection unit selects the second transmission mode until synchronization ends. When synchronization ends, the selection unit selects the first transmission mode.

Preferably, the communication apparatus further includes: a reception unit configured to receive information from the reception apparatus; and a sensing unit configured to sense a request for transmission in accordance with the second transmission mode from the information received by the reception unit. The selection unit selects the second transmission mode in response to the sensing of the request.

Preferably, the communication apparatus further includes: a reception unit configured to receive information from the reception apparatus; and a sensing unit configured to sense a request for ending transmission in accordance with the second transmission mode from the information received by the reception unit. The selection unit selects the first transmission mode in response to the sensing of the request.

Preferably, the communication apparatus further includes a sensing unit configured to sense start of transmission of the packet by the transmission unit or resumption of transmission of the packet by the transmission unit. The selection unit selects the second transmission mode in response to the sensing by the sensing unit.

Preferably, the communication apparatus further includes a sensing unit configured to sense lapse of a predetermined time period since start of transmission of the packet by the transmission unit or transmission of predetermined number of packets. The selection unit selects the first transmission mode in response to the sensing by the sensing unit.

Preferably, in the second transmission mode, the transmission unit transmits the packet, with a physical rate being fixed, based on a communication characteristic defined in accordance with a type of the network.

Preferably, in the second transmission mode, the transmission unit transmits the packet, with a coding ratio and a modulation technique being fixed, based on a communication characteristic defined in accordance with a type of the network.

Preferably, the communication apparatus further includes: a reception unit configured to receive data from the reception apparatus; and a request sensing unit configured to sense a request for re-sending of the packet by the transmission unit based on the data received by the reception unit. When the request sensing unit senses the request for re-sending, the transmission unit transmits the packet. In the second transmission mode, the transmission unit transmits the packet, with a maximum number of times of packet re-sending being restricted, in accordance with a communication characteristic defined in accordance with a type of the network.

Preferably, in the second transmission mode, the transmission unit transmits the packet, with a maximum value of a back-off time period representing a waiting time from detection of non-use of carrier until transmission being restricted, based on a communication characteristic defined in accordance with a type of the network.

Preferably, in the second transmission mode, the transmission unit transmits the packet in preference to best effort representing standard priority, based on a communication characteristic defined in accordance with a type of the network.

Preferably, in the second transmission mode, the transmission unit secures a communication band and transmits the packet within the communication band, based on a communication characteristic defined in accordance with a type of the network.

Preferably, in the second transmission mode, the transmission unit designates a parameter defining transmission quality of traffic and transmits the packet with a transmission method satisfying the transmission quality, based on a communication characteristic defined in accordance with a type of the network.

Preferably, in the second transmission mode, the transmission unit transmits the packet with a maximum value for the packet held by the transmission buffer unit being restricted.

Preferably, the communication apparatus further includes a packet generation unit configured to packetize input data. In the second transmission mode, the transmission unit transmits the packet, with a packet length of the packet generated by the packet generation unit being restricted.

Preferably, in the second transmission mode, the transmission unit transmits the packet, with the packet generated by the packet generation unit being provided with an error correction code.

Preferably, the communication apparatus further includes a coding unit configured to code stream data. In the second transmission mode, the transmission unit transmits the coded steam data, with a coding rate of the coding unit being restricted.

Preferably, a packet generation unit generates a packet including at least information on time immediately before transmission by the transmission unit.

Preferably, in the second transmission mode, the transmission unit carries out transmission with a frame interval being made smaller, the frame interval representing a minimum interval between signals to be sent, from detection of non-use of carrier until transmission of the signal.

Preferably, in the second transmission mode, the transmission unit transmits the packet to the network with multicast transmission or broadcast transmission.

According to another aspect of the present invention, a recording medium storing a program for causing a computer to function as a communication apparatus communicating with a reception apparatus connected to a network is provided. The reception apparatus includes a first clock. The computer includes a second clock, a processor executing the program, and a memory, and realizes communication with the reception apparatus in a plurality of transmission modes. The plurality of transmission modes include a first transmission mode defined in advance as a standard mode of transmission by the computer and a second transmission mode different from the first transmission mode. The program causes the computer to execute the steps of: determining whether synchronization of the first clock with the second clock has ended; and selecting one transmission mode from the plurality of transmission modes in accordance with a result of determination. The selecting step includes the steps of selecting the second transmission mode until synchronization ends, and selecting the first transmission mode when synchronization ends. The program causes the computer to execute the steps of temporarily holding a packet in the memory; and transmitting the packet temporarily held in the memory to the reception apparatus based on the selected transmission mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 illustrates a modulation technique and a coding ratio of a physical rate defined under IEEE802.11a.

FIG. 11 illustrates correspondence between priority information and an access category in EDCA under IEEE802.11e.

FIG. 12 shows main TSPEC parameters.

DESCRIPTION OF THE PREFERRED EMBODIMENTS

Figure 1:
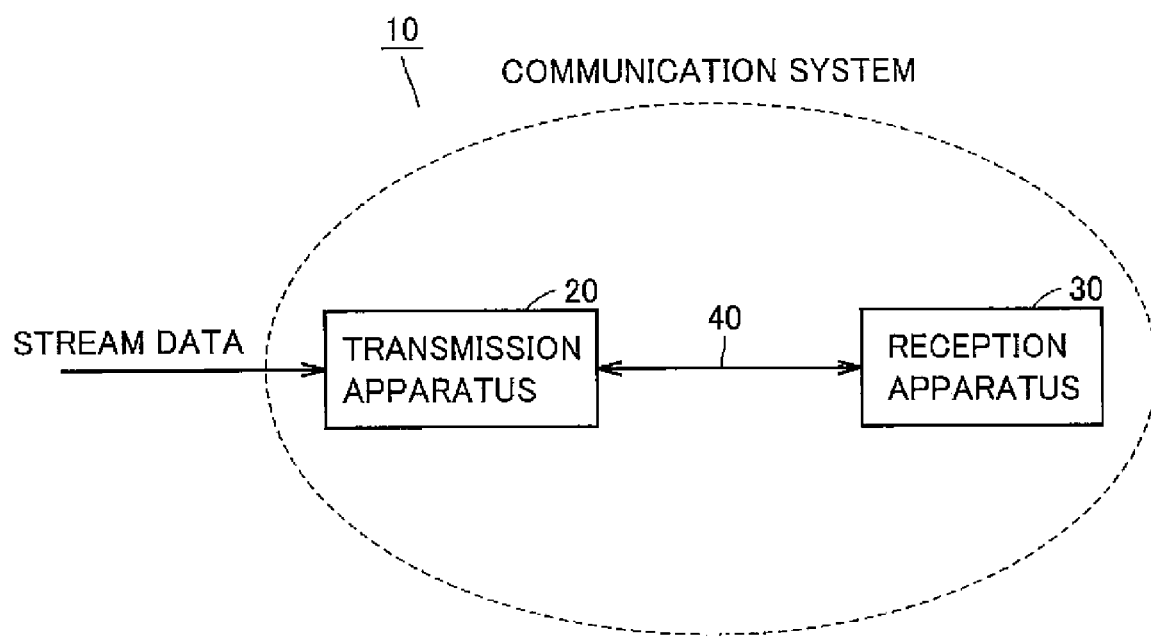
FIG. 1 illustrates a schematic configuration of a communication system 10 according to an embodiment of the present invention.

An embodiment of the present invention will be described hereinafter with reference to the drawings. In the description below, the same elements have the same reference characters allotted. Their name and function are also identical. Therefore, detailed description thereof will not be repeated.

Referring initially to FIG. 1, a configuration of a communication system 10 according to an embodiment of the present invention will be described. Communication system 10 includes a transmission apparatus 20 and a reception apparatus. Transmission apparatus 20 and a reception apparatus 30 are connected to each other via a communication medium 40. Transmission apparatus 20 accepts input of stream data such as a video image or voice and sound.

Transmission apparatus 20 attains functions to code the stream data, to generate a packet based on the coded data, to temporarily hold the packet, to transmit the packet to a designated destination, and to select a transmission method for synchronization control by reception apparatus 30.

There are two transmission methods of a transmission method capable of suppressing jitter of a packet transmission time period to minimum (hereinafter referred to as "jitter suppressed transmission"); and a transmission method of communicating most efficiently without talking into consideration jitter of the packet transmission time period (hereinafter referred to as "normal transmission"). In addition, transmission apparatus 20 desirably has functions to detect a communication medium used for communication with reception apparatus 30 and to control "jitter suppressed transmission" in accordance with a characteristic of the detected communication medium.

On the other hand, reception apparatus 30 has functions to receive a packet from communication medium 40, to temporarily hold the packet, and to decode the received packet. In addition, reception apparatus 30 also has functions to detect variation in the packet transmission time period calculated based on a difference between the time of packet reception obtained from a contained system clock and time information of the transmission apparatus inserted in the packet, and to synchronize the contained system clock with the system clock of transmission apparatus 20, based on the detected variation.

Though FIG. 1 shows communication system 10 including single transmission apparatus 20 and single reception apparatus 30 for brevity, a communication apparatus in another aspect may include a plurality of transmission apparatuses and reception apparatuses. In addition, though the transmission apparatus is distinguished from the reception apparatus, the transmission apparatus may have a function as a reception apparatus receiving a signal. Moreover, similarly, a reception apparatus may have a function as a transmission apparatus transmitting a signal.

Communication medium 40 can be implemented by various communication media, such as wireless LAN complying with specifications including IEEE802.11a/b/g, wired LAN including Ethernet®, power line communication (PLC) complying with specifications including HomePlug, short-range wireless communication including Bluetooth® and Infrared Data Association (IrDA), and the like. Therefore, the present invention is not limited to those communication media mentioned in the present embodiment.

With the use of these communication media, for example such a network system as connecting various types of equipment at home with each other can be implemented. For example, such a configuration example that transmission apparatus 20 serves as a home server such as an STB (Set Top Box) managing all types of communication equipment and video image sources at home is possible. Transmission apparatus 20 serving as the home server has a function to receive signal waves such as BS/CS (Broadcast Satellite/Communication Satellite) broadcast and digital terrestrial broadcast, or stream data such as video images or voice and sound from the Internet or the like.

In addition, reception apparatus 30 may be configured, for example, to have a function to display a video image as in a television and a function for audio output as in a speaker.

Moreover, in communication system 10 shown in FIG. 1, transmission apparatus 20 may be configured to accept input of digital data or analog data, for example, from an AV (Audio Visual) source as a media player such as a TV tuner, a DVD (Digital Versatile Disc) player, a BD (Blue-Ray Disc) player, an HD DVD (High Definition DVD) player, a video player, and the like. Alternatively, for example, the media player itself may be configured to contain a function as transmission apparatus 20.

Alternatively, communication system 10 shown in FIG. 1 may be implemented as a closed network, such as LAN at home. Alternatively, in another aspect, communication system 10 may be configured as a part of what is called a home theater system.

Figure 2:
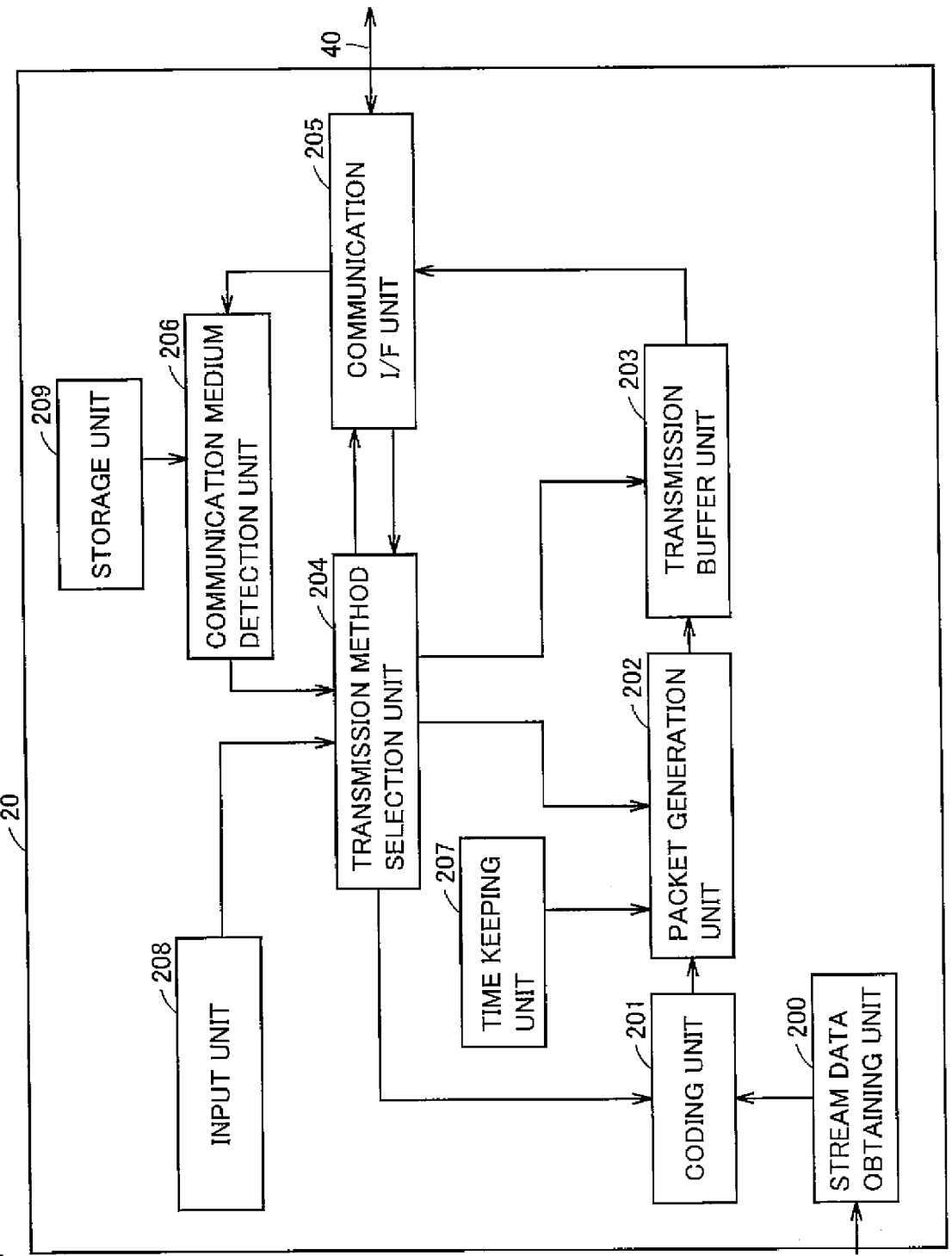
FIG. 2 is a block diagram showing a configuration of functions of a transmission apparatus 20 configuring communication system 10.

Referring next to FIG. 2, a function implemented by transmission apparatus 20 will be described. Transmission apparatus 20 includes a stream data obtaining unit 200, a coding unit 201, a packet generation unit 202, a transmission buffer unit 203, a transmission method selection unit 204, a communication I/F (Interface) unit 205, a communication medium detection unit 206, a time keeping unit 207, an input unit 208 accepting manipulation input, and a storage unit 209 storing data in a non-volatile manner.

Stream data obtaining unit 200 obtains stream data from a source outside of transmission apparatus 20. For example, in one aspect, stream data obtaining unit 200 receives stream data from another apparatus via a cable. In another aspect, stream data obtaining unit 200 is implemented as an apparatus capable of driving a removable recording medium (such as an optical disc apparatus). Here, the stream data obtaining unit reads a video audio signal recorded in the recording medium and reproduces the signal as stream data. In yet another aspect, stream data obtaining unit 200 receives stream data transmitted by radio.

Coding unit 201 converts input stream data into digital data complying with an image compression format defined as MPEG2 (Moving Picture Experts Group 2). Alternatively, in another aspect, coding unit 201 may simply change a bit rate of already coded stream data.

Time keeping unit 207 generates time information in transmission apparatus 20. The time information is input to packet generation unit 202.

Packet generation unit 202 generates a packet based on the coded data. Packet generation unit 202 aggregates and combines the coded data so that a packet has an appropriate length. Here, for allowing reception apparatus 30 to decode at appropriate timing, the time information obtained by time keeping unit 207 is contained in the packet together with the coded data. The time information contained in the packet is, for example, time information at the time point when the data to be coded by packet generation unit 202 is input to packet generation unit 202. Alternatively, the time when the packet is generated may be contained in the packet.

In another aspect, the information of time at the time point when the packet is output from transmission buffer unit 203 may be contained in the packet. The transmission apparatus according to this aspect, for example, has a configuration for adding to the packet, the information of time at the time point when the packet is output, between transmission buffer unit 203 and communication I/F unit 205.

Transmission buffer unit 203 temporarily stores the data packetized in packet generation unit 202. Transmission buffer unit 203 is implemented by a recording medium rewritable at high speed, such as a RAM (Random Access Memory).

Transmission method selection unit 204 selects any one of "jitter suppressed transmission" and "normal transmission" as a transmission mode and defines transmission via communication I/F unit 205. More specifically, transmission method selection unit 204 selects any of jitter suppressed transmission and normal transmission in accordance with a manner of communication defined in accordance with communication medium 40. The manner of communication includes communication specifications with which communication medium 40 complies.

In another aspect, transmission method selection unit 204 may select any type of transmission, in response to input to input unit 208. The input includes, for example, input of an item indicating a manner of communication defined in accordance with communication medium 40.

Communication I/F unit 205 transmits the packetized stream data stored in transmission buffer unit 203, to reception apparatus 30 via communication medium 40, with a transmission method designated by transmission method selection unit 204.

In addition, if reception apparatus 30 has a function to transmit a packet, communication I/F unit 205 can also receive a packet transmitted from reception apparatus 30. Alternatively, communication I/F unit 205 may be an interface adapted only to a single communication medium or an interface supporting communication via each of a plurality of communication media.

Communication medium detection unit 206 identifies communication medium 40 that communication I/F unit 205 is using and obtains data for controlling a function supported by communication I/F unit 205 and communication via communication I/F unit 205. For example, communication medium detection unit 206 obtains, from storage unit 209, data representing a type of communication medium 40, setting data for establishing communication adapted to that type, and a program for controlling communication (such as driver software controlling the interface).

Communication medium detection unit 206 sends each piece of information above to transmission method selection unit 204. When "jitter suppressed transmission" is to be selected, transmission method selection unit 204 selects a method "jitter suppressed transmission" in accordance with the characteristic of communication medium 40 identified by the information.

More specifically, description will be given, for example, with reference to a PC (Personal Computer). A function implemented by communication medium detection unit 206 corresponds to an operation by a processor included in the PC to identify an NIC (Network Interface Card) implementing communication I/F unit 205 and a driver thereof Communication medium detection unit 206 identifies a driver of an NIC, a version of the driver, a resource that is used (such as a memory range, IRQ (Interrupt ReQuest), or the like), and obtains a method of accessing detailed setting information specific to the driver.

It is noted that communication medium detection unit 206 is not a feature essential to transmission apparatus 20 according to the present embodiment. A transmission apparatus according to another embodiment may not have communication medium detection unit 206. In such a case, it is assumed that transmission method selection unit 204 has identified communication medium 40 in advance and knows a function supported by communication I/F unit 205 and processing performed for implementing that function. A manner of identifying communication medium 40 in advance may be such that, for example in configuring a communication system, data representing a type of a communication medium or data defining a manner of communication via a communication medium is input to a transmission apparatus via input unit 208.

Input unit 208 accepts manipulation by a user of transmission apparatus 20. Manipulation includes input of setting data for causing transmission apparatus 20 to establish specific communication. In one aspect, the setting data includes data for identifying communication medium 40. Storage unit 209 is implemented, for example, as a flash memory or other media capable of holding data in a non-volatile manner. Storage unit 209 stores data externally provided to transmission apparatus 20 via input unit 208 or data obtained by communication I/F unit 205 via communication medium 40.

Figure 3:
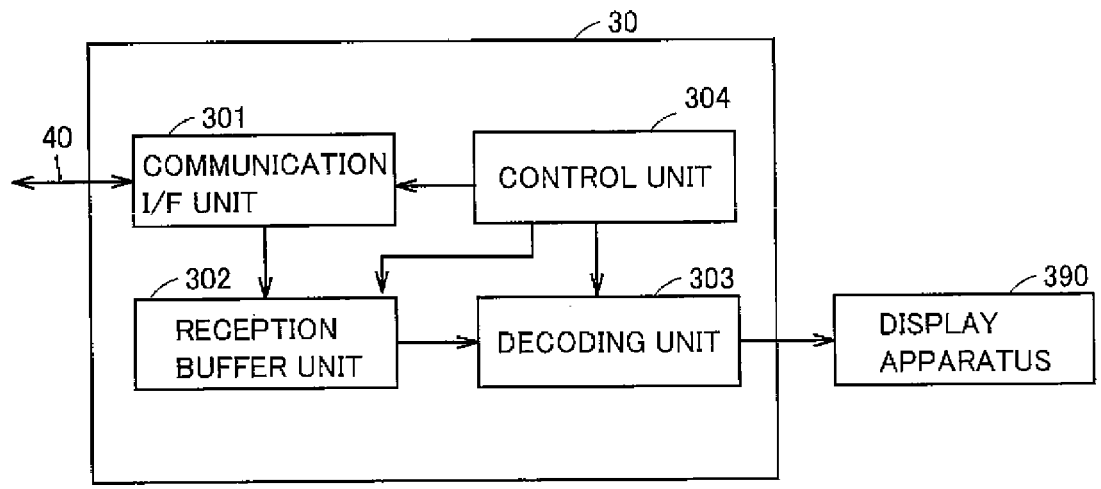
FIG. 3 is a block diagram showing a configuration of functions of a reception apparatus 30 configuring communication system 10.

Referring next to FIG. 3, a function implemented by reception apparatus 30 will be described. Reception apparatus 30 includes a communication I/F unit 301, a reception buffer unit 302, a decoding unit 303, and a control unit 304. Reception apparatus 30 is connected to a display apparatus 390 via a cable.

Communication I/F unit 301 receives a packet transmitted from transmission apparatus 20 and performs processing defined in advance, that is to be performed at the time of reception of a packet. Alternatively, in another aspect, communication I/F unit 301 can also transmit a packet to transmission apparatus 20. In addition, communication I/F unit 301 may be adapted to communication via a single communication medium or may be configured to support communication via each of a plurality of communication media.

Reception buffer unit 302 temporarily holds received stream data. Reception buffer unit 302 is implemented, for example, as a RAM capable of high-speed data writing and reading. Reception buffer unit 302 outputs the held stream data to decoding unit 303 at the timing that defines processing by decoding unit 303.

Decoding unit 303 decodes the input stream data. In addition, decoding unit 303 outputs the decoded signal to display apparatus 390 via a cable serving as an interface for output to the outside of reception apparatus 30.

Control unit 304 controls communication I/F unit 301, reception buffer unit 302 and decoding unit 303. Control unit 304 senses a capacity of data held in reception buffer unit 302. Control unit 304 keeps time in reception apparatus 30.

In one aspect, control unit 304 controls reception buffer unit 302 and decoding unit 303, using the result of time keeping. For example, control unit 304 sends data held in reception buffer unit 302 to decoding unit 303, at the timing in accordance with the processing by decoding unit 303.

Display apparatus 390 is implemented, for example, by a liquid crystal display apparatus displaying a video image based on an input video signal. In another aspect, display apparatus 390 may be implemented by a television set receiving a signal and displaying a video image based on a video audio signal included in that signal. Alternatively, reception apparatus 30 may be configured to include display apparatus 390.

In the present embodiment, in transmission apparatus 20, packet generation unit 202 inserts time information into a packet. Here, it is assumed that, in reception apparatus 30, the stream data held in reception buffer unit 302 is not output to decoding unit 303 until stream data corresponding to a time period (buffer time period) set in advance in reception buffer unit 302 is accumulated. Such control is carried out by control unit 304 having functions to sense a capacity of data held in reception buffer unit 302, to read data from reception buffer unit 302, and to send the data to decoding unit 303.

After data corresponding to the buffer time period set in advance in reception buffer unit 302 is accumulated, control unit 304 sends the stream data to decoding unit 303 at appropriate timing in accordance with the time information inserted into the packet by packet generation unit 202.

In reception apparatus 30, however, control unit 304 determines a time to output the stream data to decoding unit 303, based on the time information inserted by transmission apparatus 20. Accordingly, if the system clock of transmission apparatus 20 (for example, time keeping unit 207) and the system clock of reception apparatus 30 (for example, internal clock of control unit 304) are not synchronous, the stream data is output from reception buffer unit 302 to decoding unit 303 at timing later or earlier than actual.

For example, if the system clock of reception apparatus 30 is earlier than the system clock of transmission apparatus 20, the stream data accumulated in reception buffer unit 302 is output to decoding unit 303 by control unit 304 at timing earlier than actual. If such a condition continues, reception buffer unit 302 enters an "underflow" state.

On the other hand, if the system clock of reception apparatus 30 is behind the system clock of transmission apparatus 20, the stream data accumulated in reception buffer unit 302 is output to decoding unit 303 by control unit 304 at timing later than actual. Consequently, if such a condition continues, reception buffer unit 302 enters an "overflow" state.

In order to prevent such a condition, the system clock of reception apparatus 30 and the system clock of transmission apparatus 20 should be synchronous with each other. For example, a method of using a packet transmission time period is effective as processing for synchronization. In the present embodiment, the following configuration is employed. Initially, when reception apparatus 30 receives a packet, control unit 304 obtains a time of reception of that packet from an internal clock (not shown), calculates a difference between that time and the time information inserted in the packet (namely, the time information inserted by transmission apparatus 20 before transmission), and employs the difference as the packet transmission time period.

If the packet transmission time period varies in a direction decreasing with lapse of time, it is considered that the system clock of reception apparatus 30 is slower than the system clock of transmission apparatus 20. Then, in reception apparatus 30, control unit 304 calculates a rate of change in the packet transmission time period, and if the rate of change is negative, control unit 304 determines that the system clock of reception apparatus 30 is slower than that of transmission apparatus 20. Thereafter, control unit 304 makes the internal system clock faster. Here, a rate of making faster the system clock may be set, for example, to an absolute value of the rate of change above. After a time period for which the rate of change was calculated elapses, correction up to the time point of start of detection has been completed.

On the other hand, if the packet transmission time period varies in a direction increasing with lapse of time, it is considered that the system clock of reception apparatus 30 is faster than the system clock of transmission apparatus 20. Then, if the rate of change is negative, control unit 304 corrects the system clock of reception apparatus 30 such that the time progresses slower.

Thus, reception apparatus 30 according to one aspect can carry out control for synchronization with transmission apparatus 20, by observing variation in the packet transmission time period.

It has been known, however, that the packet transmission time period jitters and the jitter fluctuates depending on a state of communication medium 40 or on a transmission method employed by communication I/F unit 205 in transmission apparatus 20. In order to allow reception apparatus 30 to carry out accurate synchronization control, a packet is preferably transmitted with such a transmission method that transmission apparatus 20 suppresses jitter of the packet transmission time period as much as possible. In addition, though the packet transmission time period may become longer on average, synchronization control by reception apparatus 30 is facilitated as jitter is smaller.

In communication system 10 according to the present embodiment, two transmission states of "normal transmission" efficiently transmitting stream data to reception apparatus 30 from a viewpoint of a transmission time period and "jitter suppressed transmission" transmitting a packet such that jitter of the packet transmission time period is suppressed to minimum are provided.

For example, while transmission apparatus 20 is in a "jitter suppressed transmission" state, transmission method selection unit 204 selects a transmission method for suppressing jitter of the packet transmission time period. In order to suppress jitter of the packet transmission time period to minimum, transmission method selection unit 204 controls a type of communication medium 40 used by communication I/F unit 205, a function supported by communication I/F unit 205, or the like, depending on a characteristic of the communication medium.

In identifying communication medium 40, transmission method selection unit 204 may sometimes be able to identify the characteristic of communication medium 40 in advance, and sometimes may not. If transmission method selection unit 204 is unable to do so, communication medium detection unit 206 detects a type of communication medium 40 and notifies transmission method selection unit 204 of the characteristic of communication medium 40 identified based on that type. Alternatively, if communication I/F unit 205 supports a plurality of communication media even when transmission method selection unit 204 is able to identify the characteristic of the communication medium in advance, a transmission method in "jitter suppressed transmission" is different depending on a communication medium. Therefore, in this case as well, transmission apparatus 20 preferably has communication medium detection unit 206.

A packet to be transmitted has been described in the present embodiment as stream data to which time information has been added, however, another piece of data may be transmitted as a packet. For example, data transmitted in the "jitter suppressed transmission" state may not be stream data but may be dummy data where only time information is inserted in a payload portion. When transmission apparatus 20 transmits dummy data while communication system 10 is in the "jitter suppressed transmission" state, viewing of a video image is impossible in reception apparatus 30. On the other hand, as transmission apparatus 20 can transmit many packets in a short period of time by transmitting dummy data where only time information is inserted in a payload portion, reception apparatus 30 can achieve synchronization of the system clock in a short period of time.

Details of a packet transmission method in the "jitter suppressed transmission" state will be described later, and "jitter suppressed transmission" is originally for suppressing jitter of the packet transmission time period to minimum. Therefore, as compared with a transmission method in "normal transmission", jitter suppressed transmission may be disadvantageous in transmission of stream data, in terms of possibility that data transmission efficiency is low or packet loss is increased. Accordingly, transmission method selection unit 204 should appropriately switch the transmission mode of transmission apparatus 20 between "jitter suppressed transmission" and "normal transmission".

A method of switching between "jitter suppressed transmission" and "normal transmission" will be described hereinafter.

[Switching Timing Setting Method 1: Manner Where Independent Determination by the Transmission Apparatus is Made]

Figure 4:
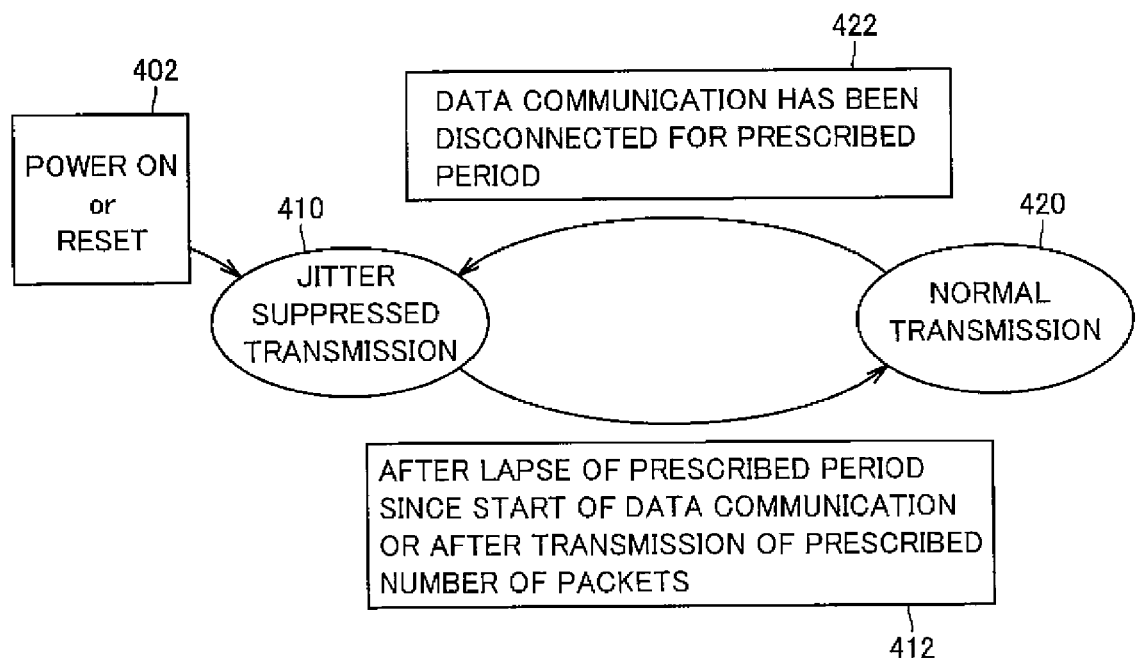
FIG. 4 illustrates a state transition between jitter suppressed transmission and normal transmission (where transmission apparatus 20 independently determines switching).

Initially, referring to FIG. 4, an example where transmission apparatus 20 independently determines timing to switch between "jitter suppressed transmission" and "normal transmission" will be described. FIG. 4 is a diagram showing transition of a transmission mode in transmission apparatus 20.

In an example where independent determination by transmission apparatus 20 is made, transmission apparatus 20 is in the "jitter suppressed transmission" 410 state immediately after power on or reset of transmission apparatus 20 (event 402). Therefore, from the beginning, transmission apparatus 20 transmits data with a transmission method suppressing jitter of the packet transmission time period. Then, after a predetermined period of time has elapsed since start of data communication or after a predetermined number of packets are transmitted (event 412), transmission apparatus 20 switches the transmission mode from "jitter suppressed transmission" to "normal transmission" 420. In addition, if communication with reception apparatus 30 has been disconnected for a predetermined period of time while the transmission state is set to "normal transmission" 420 (event 422), transmission apparatus 20 switches the transmission state from "normal transmission" 420 to "jitter suppressed transmission" 410.

[Switching Timing Setting Method 2: Example Where Switching is Based on an Instruction from the Reception Apparatus]

Figure 5:
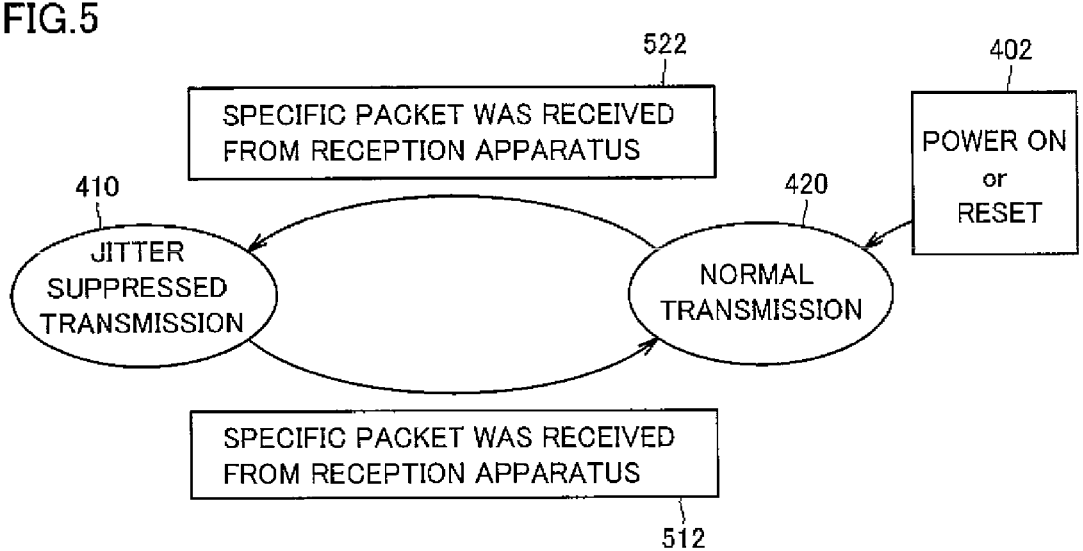
FIG. 5 illustrates a state transition between jitter suppressed transmission and normal transmission (where transmission apparatus 20 determines switching based on a packet from reception apparatus 30).

Referring next to FIG. 5, an example where switching between "jitter suppressed transmission" and "normal transmission" by transmission apparatus 20 is made when a specific packet is received from reception apparatus 30 will be described. FIG. 5 is a diagram showing transition of a transmission mode in transmission apparatus 20.

Transmission apparatus 20 sets the transmission mode to "normal transmission" 420 immediately after power on or reset thereof (event 502). When transmission apparatus 20 receives a packet requesting switching of the transmission mode from "normal transmission" 420 to "jitter suppressed transmission" 410 from reception apparatus 30 (event 522), transmission apparatus 20 switches the transmission mode to "jitter suppressed transmission" 410.

Thereafter, when transmission apparatus 20 receives a packet requesting switching of the transmission mode from "jitter suppressed transmission" 410 to "normal transmission" 420 from reception apparatus 30 (event 512), transmission apparatus 20 switches the transmission mode to "normal transmission" 420.

It is noted that timing of transmission of a packet requesting switching between "jitter suppressed transmission" 410 and "normal transmission" 420 by reception apparatus 30 may be determined by reception apparatus 30 itself based on internal data, or the timing may be determined based on manipulation by a user of reception apparatus 30.

In addition, for a packet transmitted from reception apparatus 30 to transmission apparatus 20, it is assumed that payload and meaning thereof have been defined in advance between transmission apparatus 20 and reception apparatus 30. Moreover, the content in the packet is not limited to the content specialized only for switching between "jitter suppressed transmission" 410 and "normal transmission" 420 above, and other information may be contained.

[Switching Timing Setting Method 3: Combination of Setting Methods 1 and 2]

The timing of switching between "jitter suppressed transmission" 410 and "normal transmission" 420 may be defined based on combination of the manner of switching based on independent determination by transmission apparatus 20 and the manner of switching at the time of reception of a specific packet from reception apparatus 30.

Figure 6:
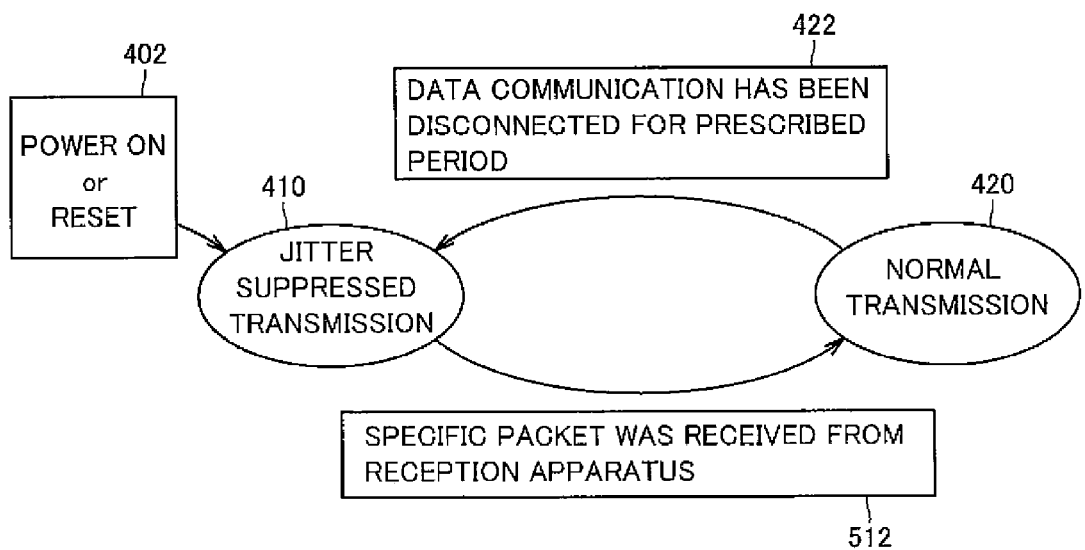
FIG. 6 illustrates a state transition between jitter suppressed transmission and normal transmission (where switching from jitter suppressed transmission to normal transmission is made based on a packet from reception apparatus 30 and switching in a reverse direction is based on determination by transmission apparatus 20).
Figure 7:
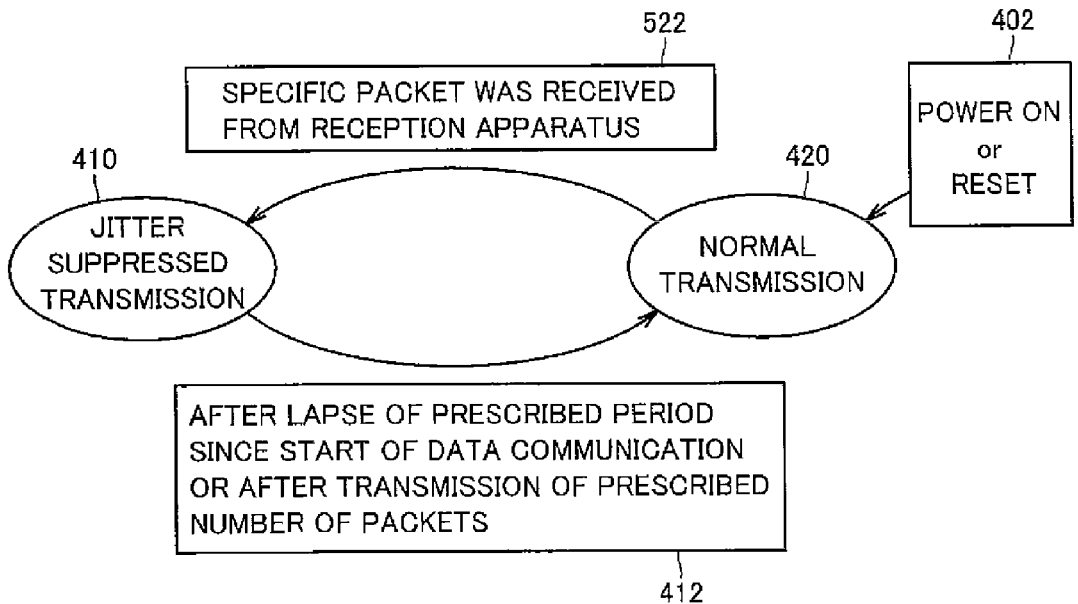
FIG. 7 illustrates a state transition between jitter suppressed transmission and normal transmission (where transmission apparatus 20 independently determines switching from jitter suppressed transmission to normal transmission and switching in a reverse direction is based on a packet from reception apparatus 30).
Figure 8:
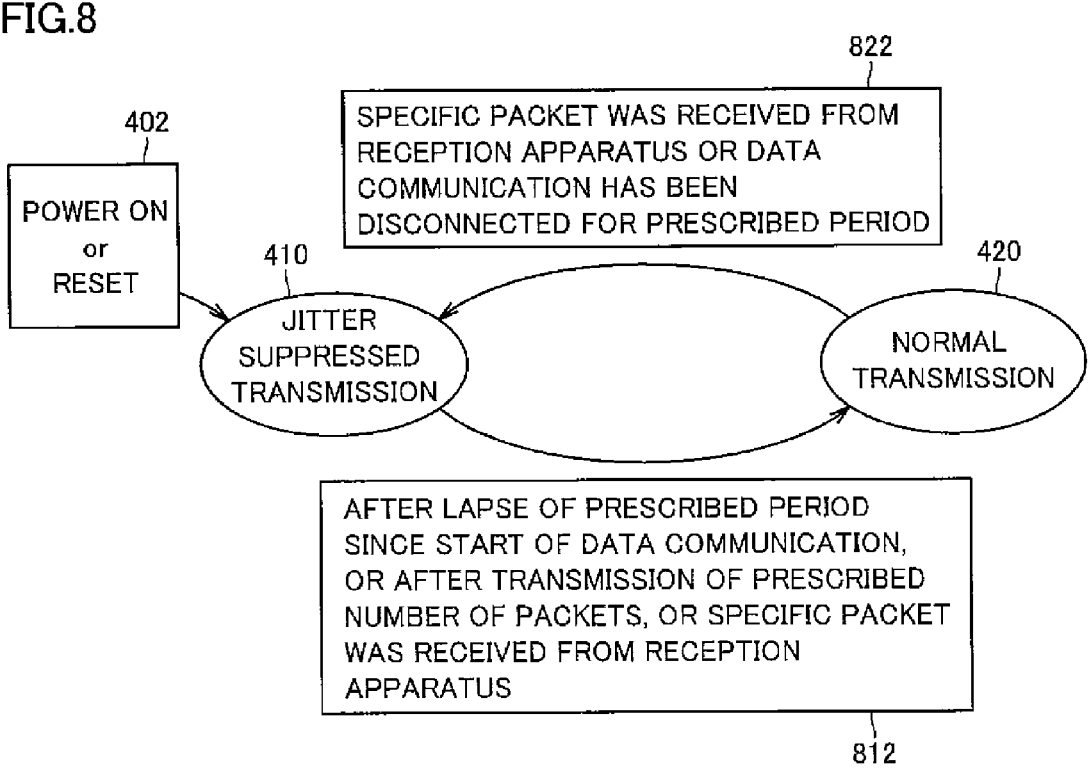
FIG. 8 illustrates a state transition between jitter suppressed transmission and normal transmission (where switching is made when any one of independent determination by transmission apparatus 20 and reception of a packet from reception apparatus 30 is satisfied).

Referring now to FIGS. 6 to 8, other manners representing timing of switching between "jitter suppressed transmission" 410 and "normal transmission" 420 will be described. FIGS. 6 to 8 are diagrams illustrating state transition where timing of switching is defined by any of transmission apparatus 20 and reception apparatus 30.

For example, immediately after power on or reset of transmission apparatus 20 (event 402), transmission apparatus 20 is in the "jitter suppressed transmission" 410 state. Here, it is assumed that the timing to switch the transmission mode from "jitter suppressed transmission" 410 to "normal transmission" 420 is set, for example, to timing of reception by transmission apparatus 20 of a specific packet transmitted from reception apparatus 30 (event 512). Thereafter, if communication between transmission apparatus 20 and reception apparatus 30 has been disconnected for a predetermined period of time while transmission apparatus 20 is in the "normal transmission" 420 state (event 422), transmission apparatus 20 switches the transmission state from "normal transmission" 420 to "jitter suppressed transmission" 410, using sensing of disconnection of communication as trigger.

Referring to FIG. 7, in another aspect, timing of switching to "jitter suppressed transmission" 410 may be set to timing of reception by transmission apparatus 20 of a specific packet from reception apparatus 30.

Specifically, immediately after power on or reset of transmission apparatus 20 (event 402), the transmission mode of transmission apparatus 20 is set to the "normal transmission" 420 state. The timing of switching of the transmission mode to "jitter suppressed transmission" 410 may be set to timing of reception by transmission apparatus 20 of a specific packet from reception apparatus 30 (event 522). Thereafter, the timing of switching from "jitter suppressed transmission" to the "normal transmission" state may be independently determined by transmission apparatus 20, and it may be after a prescribed period has elapsed since start of jitter transmission or after a prescribed number of packets are transmitted (event 412).

Referring to FIG. 8, in yet another aspect, the timing of switching of the transmission mode may be based on combination of the events above.

For example, immediately after power on or reset of transmission apparatus 20 (event 402), transmission apparatus 20 is in the "jitter suppressed transmission" state. Here, the timing of switching to "normal transmission" 420 may be any one of timing after a predetermined period of time has elapsed since stall of data communication, timing when a predetermined number of packets are transmitted, or timing of reception by transmission apparatus 20 of a specific packet from reception apparatus 30 (event 812).

Thereafter, the timing of switching from the "normal transmission" 420 state to the "jitter suppressed transmission" 410 state of transmission apparatus 20 may be set to any one of timing when communication has been disconnected for a predetermined period of time or timing of reception of a specific packet from reception apparatus 30 (event 822).

By setting a condition for switching between "jitter suppressed transmission" 410 and "normal transmission" 420 as above, in synchronization control between transmission apparatus 20 and reception apparatus 30, transmission apparatus 20 can transmit packet data, with the transmission mode being set to "jitter suppressed transmission" 410 only when the packet transmission time period with less jitter is required, and otherwise transmission apparatus 20 can transmit stream data in "normal transmission" 420 where data can efficiently be transmitted.

An example of an embodiment in accordance with characteristics of some communication media will be described next.

[Example Where a Communication Medium is a Medium Complying with IEEE802.11a]

(1) Fixing the Physical Rate or Setting a Low Physical Rate

It is assumed that communication medium 40 is wireless LAN complying with IEEE802.11a. As a modulation technique under IEEE802.11a, OFDM (Orthogonal Frequency Division Multiplexing) where parallel transmission is carried out by dividing high-rate data into a plurality of low-rate data rows and by using a plurality of sub carriers is employed. Any one of BPSK (Binary Phase Shift Keying), QPSK (Quadrature Phase Shift Keying), 16 QAM (Quadrature Amplitude Modulation), and 64 QAM is employed as a modulation technique for each sub carrier. Transmission efficiency is lowest in BPSK and highest in 64 QAM. Specifically, in 1 symbol time, BPSK is capable of 1-bit transmission, while 64 QAM is capable of 6-bit transmission.

In addition, OFDM is generally used in combination with error correction coding, in order to relieve a sub carrier buried in noise due to influence of multipath propagation. Accordingly, a certain percentage of a radio modulation rate is allocated to a monotonous signal for error correction. For example, where 64 QAM is employed as the modulation technique, the radio modulation rate is 72 Mbps, and use of ¼ thereof for error correction brings about a data transmission rate in a layer above the physical layer of 54 Mbps. A ratio between the data transmission rate and the radio modulation rate here is ¾, and this ratio is called a coding ratio. Under IEEE802.11a, eight types of data transmission rates of 6, 9, 12, 18, 24, 36, 48, and 54 Mbps are defined in accordance with four modulation techniques and coding ratios, and such a data transmission rate is called a physical rate.

Referring next to FIG. 9, relation among the physical rate (PHY rate), the modulation technique, and the coding ratio will be described.

In general, as the number of bits that can be transmitted per 1 symbol is greater, a necessary ratio between carrier wave and noise becomes higher. Accordingly, turning to the modulation technique, error is most likely in 64 QAM and least likely in BPSK. In addition, as the coding ratio is lower, the number of bits used for error correction is greater and error is less likely. Namely, under IEEE802.11a, with a high physical rate, more data can be transmitted but error is more likely. With a low physical rate, only a small amount of data can be transmitted but error is less likely.

In communication system 10 where communication medium 40 complies with IEEE802.11a, in the "normal transmission" state, transmission apparatus 20 communicates with reception apparatus 30 with the physical rate being switched, such that optimal throughput is achieved in accordance with a communication status.

For example, where transmission apparatus 20 is arranged proximate to reception apparatus 30, as error is less likely at any physical rate, a high physical rate is preferably used. In contrast, where transmission apparatus 20 is arranged at a distance from reception apparatus 30, even if transmission apparatus 20 employs a high physical rate for transmitting data, reception apparatus 30 cannot correctly receive the data and reception error of most data is likely. Therefore, transmission apparatus 20 preferably uses a low physical rate.

If the physical rate is different, however, the packet transmission time period is also largely different. Accordingly, in a state that the physical rate is frequently switched, it may sometimes be difficult to suppress jitter of the packet transmission time period.

Figure 10:
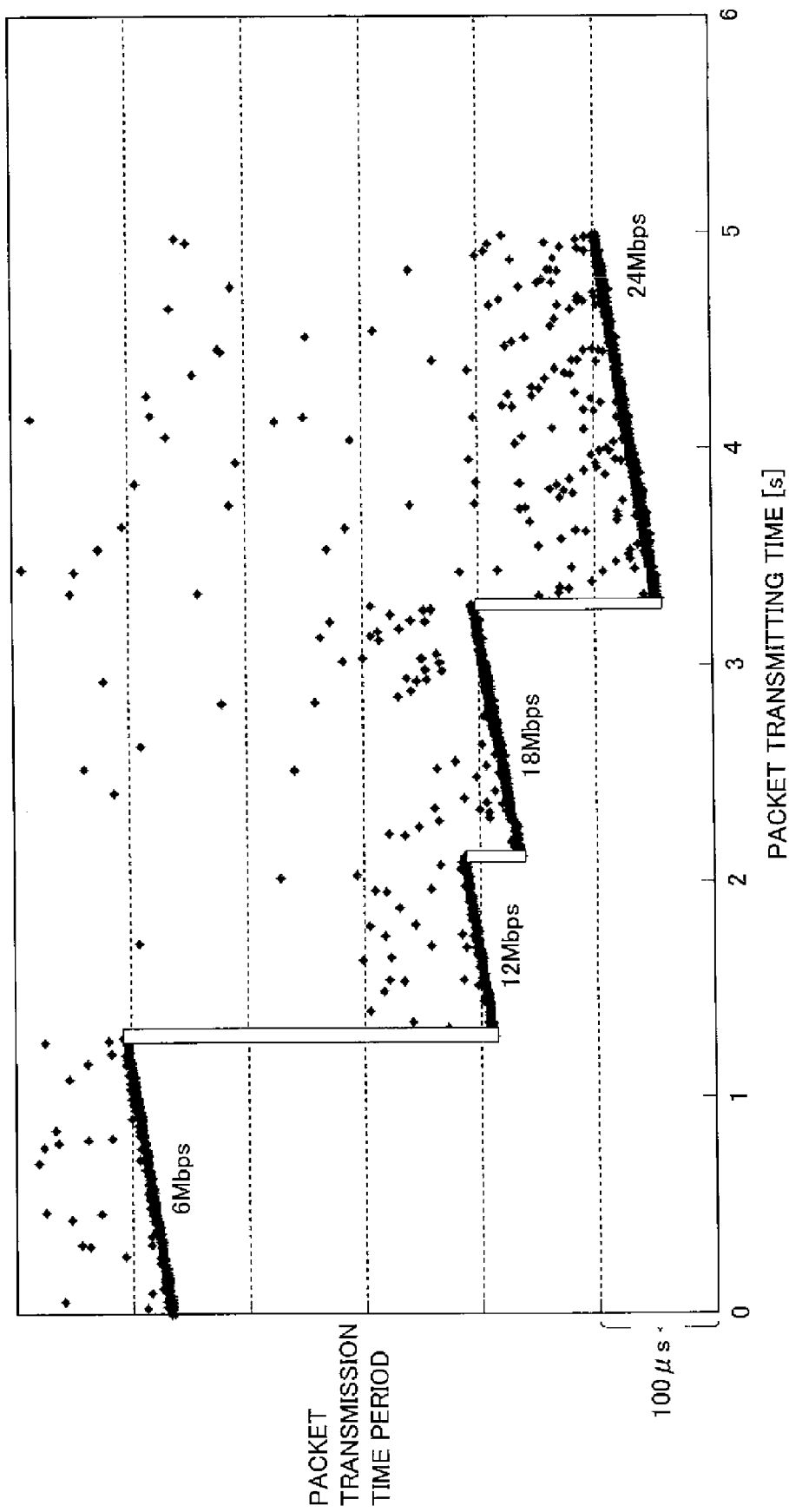
FIG. 10 illustrates difference in a packet transmission time period depending on a physical rate.

Referring to FIG. 10, difference between a time when a packet is transmitted (packet transmission time) and a packet transmission time period for each physical rate will be described. FIG. 10 illustrates variation in the packet transmission time period (a value obtained by subtracting a time of transmission included in the packet from a time of reception when the packet is received) actually measured by reception apparatus 30, when the packet is transmitted with the physical rate being varied from 6 Mbps to 12 Mbps, 18 Mbps, and 24 Mbps. Here, the slope of the graph originates from difference in a frequency, as the progress of the system clock of transmission apparatus 20 is different from that of reception apparatus 30.

As shown in FIG. 10, it is understood that the packet transmission time period varies at the timing of variation in the physical rate. For example, when the physical rate varies from 6 Mbps to 12 Mbps, the packet transmission time period is smaller by approximately 300 μs. As is clearly seen from this fact, in a state that the physical rate of transmission apparatus 20 frequently varies in communication system 10, the packet transmission time period significantly jitters.

Here, the reason why the packet transmission time period becomes shorter as the physical rate is higher may be because transmission is faster as a wider band is used for transmitting the same packet length. The packet transmission time period varies depending on a packet length. Therefore, during a period in which the transmission mode of transmission apparatus 20 is set to "jitter suppressed transmission", the packet length is desirably fixed.

In addition, in communication system 10 complying with IEEE802.11a, reception apparatus 30 can return acknowledge (ACK) in response to the packet transmitted by transmission apparatus 20. Transmission apparatus 20 can know whether reception apparatus 30 has normally received the packet based on ACK. Therefore, if reception apparatus 30 did not return ACK in response to the transmitted packet or if reception apparatus 30 returned ACK indicating reception error of the transmitted packet, transmission apparatus 20 can determine that data was not normally received by reception apparatus 30 and can re-send the packet corresponding to that ACK. By utilizing such a re-sending mechanism, communication system 10 can reduce packet loss.

If the time information within the packet to be re-sent is not updated, however, the packet transmission time period calculated by reception apparatus 30 consequently includes a time period required for re-sending. As a result, the packet transmission time period has a value significantly different from transmission time periods of other packets that were normally received without the need for re-sending. As whether the packet is re-sent or not is dependent on the status of communication medium 40, none of transmission apparatus 20 and reception apparatus 30 can expect re-sending. Accordingly, in order to suppress jitter of the packet transmission time period, the packet is desirably transmitted in single transmission, without being re-sent.

From the foregoing, in order to provide a stable packet transmission time period to reception apparatus 30, a packet is preferably transmitted with a transmission method using a constant physical rate and with least chances of re-sending. For example, by transmitting a packet with the physical rate being fixed to 6 Mbps where error is most unlikely, occurrence of re-sending can be suppressed to minimum. Therefore, jitter of the packet transmission time period can be suppressed.

Here, an example where transmission is carried out with the physical rate being fixed to lowest 6 Mbps has been described as a method of providing a stable packet transmission time period to reception apparatus 30, however, the physical rate is not necessarily fixed to such a value. If stable packet transmission is possible (re-sending hardly occurs) at a physical rate other than 6 Mbps, a transmission method with the physical rate being fixed to that physical rate may be employed.

(2) Fixing the Stream Coding Rate or Setting a Low Coding Rate

Alternatively, in another aspect, in order to allow continuous viewing and hearing of a video image and voice and sound in reception apparatus 30 based on the stream data even when the physical rate is set to 6 Mbps, the stream coding rate in coding unit 201 is desirably decreased to an amount of data that can be transmitted at a physical rate of 6 Mbps. For example, during a period in which transmission apparatus 20 carries out "jitter suppressed transmission" and the physical rate is fixed to 6 Mbps, the data amount can be decreased based on an instruction to perform coding at 3 Mbps from transmission method selection unit 204 to coding unit 201.

In addition, from a viewpoint of allowing a user of reception apparatus 30 to continuously view the video image, also in "normal transmission", transmission apparatus 20 preferably sets the stream coding rate appropriately in accordance with the physical rate.

Specifically, initially in wireless LAN complying with IEEE802.11 series, a CSMA/CA (Carrier Sense Multiple Access with Collision Avoidance) technique is adopted as an access control technique for the MAC layer. When communication system 10 establishes communication complying with the CSMA/CA technique, the stream coding rate in transmission apparatus 20 is preferably set to approximately half the physical rate.

In addition, when transmission apparatus 20 sets a low stream coding rate, generation of a waiting time in an internal buffer of communication I/F unit 205 is less likely. Therefore, transmission apparatus 20 can provide a more stable packet transmission time period to reception apparatus 30. Thus, during a "jitter suppressed transmission" period, transmission apparatus 20 may employ a transmission method with the stream coding rate being fixed, or a transmission method setting a low coding rate.

(3) Not Performing Re-Sending or Restricting the Number of Times of Re-Sending

In addition, as described previously, in wireless LAN complying with IEEE802.11a, re-sending is most unlikely when a physical rate of 6 Mbps is employed. On the other hand, a communication condition where re-sending occurs even when the physical rate is set to 6 Mbps is also possible. If re-sending occurs, the time period required for re-sending is also added to the packet transmission time period measured by reception apparatus 30, and therefore, the packet transmission time period may not be stable.

Accordingly, in another aspect, transmission apparatus 20 may employ such a method as not re-sending a packet at all or restricting the number of times of re-sending the packet. When transmission apparatus 20 restricts the number of times of re-sending, jitter of the packet transmission time period due to the time period required for re-sending can be suppressed. Here, though frequency of occurrence of packet loss increases, the packet transmission time period for the packet received by reception apparatus 30 becomes more stable.

(4) Restricting Buffer Capacity

In addition, when transmission apparatus 20 resends a packet, input of the stream data to transmission apparatus 20 continues also during re-sending. Therefore, packets queuing for transmission are accumulated in transmission buffer unit 203. As the packet queuing for transmission in transmission buffer unit 203 is received by reception apparatus 30, the packet transmission time period becomes longer by the time for queuing.

Here, a time period during which a packet is accumulated in transmission buffer unit 203 is not constant. Accordingly, in order to eliminate influence of a waiting time in transmission buffer unit 203, a buffer capacity of transmission buffer unit 203 may be restricted. In such a case, even if a next packet is generated in packet generation unit 202 while transmission apparatus 20 resends a certain packet, that packet is discarded without being accumulated in transmission buffer unit 203. Though frequency of occurrence of packet loss increases, the packet transmission time period for a packet received by reception apparatus 30 becomes more stable. Alternatively, if a method of having a packet include time information at the time point when the packet is output from transmission buffer unit 203 is adopted, influence of the waiting time in transmission buffer unit 203 can be eliminated.

In addition to transmission buffer unit 203, an internal buffer of communication I/F unit 205 can be a location where a waiting time in the buffer is produced. Here, in another aspect, transmission apparatus 20 may restrict a buffer capacity of the internal buffer of communication I/F unit 205. Once the packet is input to communication I/F unit 205, information within the packet can no longer be rewritten. Therefore, this method is further preferred.

(5) Adding Error Detection or Error Correction Code in an Upper Layer

In addition, in order to suppress jitter of the packet transmission time period, transmission apparatus 20 may add an error detection code or an error correction code to each packet. Error correction has already been performed in the physical layer in wireless LAN complying with IEEE802.11 series, however error detection or error correction may be added in an upper layer. Thus, in communication system 10 according to this aspect, error detection and/or error correction of a packet, of which error was not fully corrected in the physical layer by reception apparatus 30, can also be addressed in an upper layer.

Normally, after error correction in the physical layer, error detection using FCS (Frame Check Sequence) in the MAC layer is performed. As to the packet of which error was detected, re-sending thereof is requested or such a packet is simply discarded. Such a method as adding error detection or error correction in the upper layer requires such a mechanism as notifying an upper layer also of a packet of which error was detected in the MAC layer. Therefore, the method is applicable only when communication system 10 is capable of such MAC control.

Examples of error correction codes include Reed-Solomon code, convolution code, and the like. Even if error of a packet is detected in the MAC layer, the error may be corrected in the upper layer.

Alternatively, transmission apparatus 20 according to one aspect may detect an error by providing checksum only for some payloads such as time information. If some payloads such as time information are not erroneous even though other payloads included in the packet are erroneous, checksum can serve as useful information for synchronizing transmission apparatus 20 with reception apparatus 30.

In communication system 10, transmission apparatus 20 or reception apparatus 30 can further stabilize the packet transmission time period by adopting the above-described method.

(6) Prioritized QoS Control

Alternatively, in communication system 10 according to another aspect, QoS (Quality of Service) of communication medium 40 is set in transmission apparatus 20, so that the packet transmission time period can further be stabilized.

For example, when communication medium 40 supports prioritized QoS as in EDCA (Enhanced Distributed Channel Access) complying with IEEE802.11e, a stabilized packet transmission time period can be provided to reception apparatus 30 when transmission apparatus 20 places priority on a packet.

Specifically, MAC complying with IEEE802.11e includes four types of access categories (AC). Priority control is carried out by differentiating between qualities of service to be provided, for each access category, A transmission queue corresponding to each access category is present within the MAC, and at the time of transmission of a frame, a CSMA/CA procedure is performed independently for each transmission queue. Here, a parameter used in access control is set for each access category in accordance with the priority of the access category, and more chances of transmission can be provided to data belonging to an access category of higher priority.

More specifically, under IEEE802.11e, priority control is carried out with the following two methods. Here, any one or both of these methods may be employed.

a) Manner of Changing a Parameter for Back-Off Control

In the CSMA/CA technique representing an access control technique for wireless LAN, back-off control is employed in order to lessen a probability of occurrence of packet collision due to simultaneous transmission of packets from a plurality of terminals when a channel (communication line) makes transition from a busy state to an idle state (not used).

If the channel is busy at the time of start of data transmission, each terminal withholds transmission for a random time from the time point when the channel enters the idle state. The time period for withholding transmission is determined by generating random numbers evenly distributed over a range from 0 to CW (Contention Window). Here, by changing the range of generated random numbers in accordance with the access category, priority control in accordance with the access category is carried out. By making smaller the range of the generated random numbers for the access category of higher priority, data transmission can be carried out with a shorter waiting time.

b) Manner of Changing an Inter Frame Space

In addition, IEEE802.11 specifications define an inter frame space (IFS) as a minimum interval between signals to be sent, before transmission of the signal. When the channel makes transition from the busy state to the idle state, transmission apparatus 20 withholds transmission for a time period comparable to the inter frame space and the back-off control is continued. Though the IFS time is fixed, communication system 10 according to one aspect can control priority by defining a plurality of lengths thereof for efficient carrier sensing.

Here, the inter frame space for distribution control is defined by DIFS (Distributed IFS). A terminal performing data transmission confirms that the channel is not used during this period or longer, and after back-off control, it is allowed to transmit a frame.

Alternatively, by setting the inter frame space as AIFS (Arbitration IFS) in accordance with the priority of the access category, priority control in accordance with each access category can be carried out. The time period for AIFS is set shorter for the access category of higher priority, and by carrying out access control based thereon, data can be transmitted with a shorter waiting time.

FIG. 11 illustrates correspondence of data priority (User Priority, UP) with each access category. The priority information specifically includes a VLAN (Virtual LAN) tag under IEEE802.1D (priority information in eight stages) and a TOS (Type of Service) field within IP (Internet Protocol) header. By carrying out priority control of the packet, even if a communication apparatus other than transmission apparatus 20 and reception apparatus 30 is present within the same channel and communication through that channel is congested, the packet can be transmitted to reception apparatus 30 preferentially and a stable packet transmission time period can be provided. Thus, in communication system 10 according to one aspect, transmission apparatus 20 may employ a transmission method where a packet is transmitted with its priority being raised during "jitter suppressed transmission".

(7) Parameterized QoS Control

In addition, as in HCCA (Hybrid Coordinator Function Controlled Channel Access) under IEEE802.11e, in an example where communication medium 40 supports parameterized QoS in communication system 10 in another aspect, a stable packet transmission time period can be provided to reception apparatus 30 by setting a QoS parameter in transmission apparatus 20. A bandwidth, a delay time, or the like can be designated by using QoS parameters.

In HCCA under IEEE802.11e, an apparatus called an HC (Hybrid Coordinator) (an access point adapted to QoS) carries out polling (sequentially making inquiry and giving a transmission right) with respect to each terminal and solves conflict of access to a channel of each terminal. HCCA acquires a channel access right always in preference to EDCA, so that detailed polling satisfying various transmission delay requests of each data stream becomes possible.

A polling frame sent by the HC to each terminal for permitting transmission includes information on channel transmission opportunity (TXOP) for allocating a packet transmission right for a prescribed period of time to a specific terminal. A terminal permitted to carry out transmission can transmit any number of frames during a period of TXOP. As the terminal can exclusively transmit packets during the period of TXOP, a stable packet transmission time period is provided irrespective of congestion of communication.

Under IEEE802.11e, a property of each piece of data or a transmission condition required by the data can quantitatively be designated by a parameter group called TSPEC (Traffic Specification).

Referring now to FIG. 12, representative TSPEC parameters will be described. As shown in FIG. 12, a desired band can be secured, for example, by designating "Mean Data Rate" (average value of the data rate) as a parameter.

In communication system 10 according to another aspect, transmission apparatus 20 may employ, during "jitter suppressed transmission", a transmission method of transmitting a packet utilizing a time period in which transmission of packets is exclusively permitted.

(8) Admission Control

Alternatively, in an example where communication medium 40 supports admission control in communication system 10 according to another aspect, if admission control is appropriately carried out, the packet transmission time period can further be stabilized.

For example, IEEE802.11e supports admission control. The access point adapted to QoS described above receives TSPEC representing a request to allocate a transmission time from each terminal and determines whether to accept or reject the TSPEC request. Such determination of acceptance is called admission control.

In a state where a network is excessively congested in a CSMA/CA environment for wireless LAN, most time is spent for a waiting time of back-off, rather than for data transmission. Even though prioritized QoS control is carried out, desired transmission quality is not satisfied in such a state that the network is excessively congested. As admission control restricts a total amount of data among which conflict for communication medium 40 occurs, excessive congestion of the network can be avoided.

The access point adapted to QoS determines whether to accept or reject a new TSPEC request based on the content of the received TSPEC and a current state. As the excessive congestion of the network can be avoided if the total amount of data among which conflict for communication medium 40 occurs is appropriately controlled, a stable packet transmission time period can be provided.

Admission control is applied to EDCA and HCCA under IEEE802.11e. Thus, during a period of "jitter suppressed transmission", a transmission method based on admission control may be employed.

In wireless LAN, admission control is particularly important. In a condition where the network is congested, the stable packet transmission time period cannot be expected. Here, if communication medium 40 does not support admission control, communication I/F unit 205 checks the congested state of the network (for example, monitoring the number of times of losing in conflict for channel access). If it is determined that congestion of the network is severe, transmission apparatus 20 desirably changes setting, for example, by extending the period of "jitter suppressed transmission".

(9) Fixing a Packet Length or Setting the Packet Length Shorter Than a Normal Packet Length Alternatively, in another aspect, a transmission method, in which packet generation unit 202 generates packets each having a shorter packet length and transmits the generated packet, may be employed. In order to shorten the packet length, packet generation unit 202 should only generate a packet without aggregating and combining packets output from coding unit 201. As the packet length is shortened by packet generation unit 202, reception error in reception apparatus 30 is less likely and a more stable packet transmission time period can be provided.

In addition, transmission by transmission apparatus 20 of a packet including not stream data but only time information (this is called dummy data) during "jitter suppressed transmission" achieves an effect equivalent to shortening the packet length. As the packet transmission time period is different depending on the packet length, the packet length is preferably fixed during a period in which the transmission mode of transmission apparatus 20 is set to "jitter suppressed transmission".

(10) Setting a Shorter Back-Off Time Period

As described above, in the CSMA/CA environment for wireless LAN, each terminal carries out back-off control and waits for a random time (such a time period is hereinafter referred to as a "back-off time period"), so that probability of collision of packets is lowered.

On the other hand, such a back-off time period that is made random each time of transmission of a packet by transmission apparatus 20 in such an environment indicates that the packet transmission time period calculated by reception apparatus 30 is also influenced by the random back-off time period. Accordingly, the back-off time period may become a cause of jitter of the packet transmission time period.

Therefore, the back-off time period is desirably as short as possible. Here, CWmin giving a minimum value of CW may be set to a value as small as possible. As a result of such setting, as the back-off time period when the packet is initially transmitted is determined by random numbers in a small value range, the back-off time period becomes more stable. Thus, such a transmission method as making the back-off time period in transmission of packets as short as possible may further be employed.

(11) Setting a Shorter Frame Inter Space

In addition, according to the CSMA/CA technique in wireless LAN, the time period for transition of the channel from the busy state to the idle state is defined as a time period during which the channel is not used for a period of DIFS or AIFS or longer. By setting this period (frame inter space) shorter, channel access conflict can be lessened and hence the packet transmission time period becomes stable. Thus, in one aspect, such a transmission method as setting a shorter frame inter space may be employed.

Where communication medium 40 complies with IEEE802.11a, various methods for suppressing jitter of the packet transmission time period are possible as described above in detail. It is not that each method is used only individually but that communication system 10 according to the present embodiment may use all these transmission methods simultaneously in the "jitter suppressed transmission" state. Alternatively, in another aspect, communication system 10 may employ several transmission methods combined or only a single transmission method.

Alternatively, a manner may be such that communication medium detection unit 206 detects not only characteristics of communication medium 40 but also whether a communication apparatus other than reception apparatus 30 is present within the same channel, and transmission method selection unit 204 determines a transmission method in "jitter suppressed transmission" in accordance with the result of detection. Alternatively, where communication system 10 according to yet another aspect has a relay apparatus (not shown) between transmission apparatus 20 and reception apparatus 30, transmission apparatus 20 may determine a transmission method in "jitter suppressed transmission" depending on whether or not communication between transmission apparatus 20 and reception apparatus 30 is established via the relay apparatus.

(12) Transmission by Multicast or Broadcast

In wireless LAN under IEEE802.11 series, the lowest physical rate is used in multicast transmission or broadcast transmission, for the following reasons. Specifically, as a plurality of terminals simultaneously receive multicast or broadcast packets, receiving terminals do not return ACK to a transmission side. Accordingly, in order to ensure that the plurality of terminals can receive the packets, the multicast or broadcast packets are transmitted at the lowest physical rate.

Utilizing such characteristics, communication system 10 according to the present embodiment may employ multicast transmission or broadcast transmission as a method in "jitter suppressed transmission". Transmission apparatus 20 may multicast or broadcast packets during a period in which the transmission mode thereof is set to "jitter suppressed transmission". Owing to the characteristics above, the packets are transmitted at the lowest physical rate.

Here, if another irrelevant terminal not configuring communication system 10 is present for communication medium 40, multicast or broadcast data is transmitted also to that terminal. If transmission apparatus 20 according to this aspect transmits a packet including solely time information (dummy data), however, a time period during which a channel on communication medium 40 is occupied can be shortened.

Even if copyright information is included in stream data, the data including the copyright information is not transmitted to a terminal irrelevant to communication system 10, by transmitting the dummy data only during "jitter suppressed transmission".

Multicast transmission or broadcast transmission can be realized independently of control specific to communication I/F unit 205. Accordingly, the method is advantageous in that it can also be realized even though transmission apparatus 20 does not know a control method specific to communication I/F unit 205 such as setting of the physical rate or restriction of the number of times of re-sending. Therefore, even when transmission apparatus 20 does not have communication medium detection unit 206, transmission as above can readily be realized.

It is noted that, if broadcast transmission is to be performed in communication system 10, lower 8 bits of an IP address of reception apparatus 30 should only be set to 255. Then, the broadcast data is transmitted to all terminals in the same sub-net, including reception apparatus 30.

Switching between "jitter suppressed transmission" and "normal transmission" will now be described. In the example where transmission apparatus 20 switches the transmission mode based on its independent determination shown in FIG. 4, conditions for switching from "jitter suppressed transmission" to "normal transmission" are such conditions as lapse of a certain predetermined time (such as 5 seconds) since start of "jitter suppressed transmission" or transmission of a predetermined number of packets (such as 2000). As to such conditions, the time elapsed since the time point of start of "jitter suppressed transmission" should be kept or the number of transmitted packets should be counted by transmission method selection unit 204. On the other hand, a condition for switching from "normal transmission" to "jitter suppressed transmission" is such a condition that data communication has been disconnected for a predetermined period of time (such as 5 seconds).

Under IEEE802.11a, specifications of reception apparatus 30 are such that ACK can be returned in the MAC layer in response to the packet transmitted by transmission apparatus 20. Accordingly, transmission apparatus 20 determines that communication has been disconnected when ACK to the stream data transmitted in the transmission mode "normal transmission" is not returned at all by reception apparatus 30. Then, after this state has continued for a predetermined period of time (such as 5 seconds), transmission apparatus 20 may switch to "jitter suppressed transmission".

Thereafter, as shown in FIG. 5, in order to make switching at the timing when transmission apparatus 20 receives a specific packet from reception apparatus 30, reception apparatus 30 should transmit a packet requesting switching of a transmission method. In addition, transmission apparatus 20 should know in advance how that packet is configured. Accordingly, it is preferred that the configuration of the packet is determined in advance between transmission apparatus 20 and reception apparatus 30 and registered in advance in transmission apparatus 20. Description will be given hereinafter, assuming that reception apparatus 30 can transmit a packet requesting switching of a transmission method and transmission apparatus 20 can detect that packet.

Initially, transmission apparatus 20 examines a received packet in communication I/F unit 205. When reception of a packet requesting switching a transmission method from reception apparatus 30 is detected, communication I/F unit 205 notifies transmission method selection unit 204 of the detection. In response to the notification, transmission method selection unit 204 switches the transmission method.

For implementing the examples shown in FIGS. 6 to 8, the methods described above may be combined.

[Example Where Communication Medium 40 Complies with IEEE802.11g/11b]

Communication system 10 according to yet another aspect may employ, as communication medium 40, a communication medium complying with other wireless LAN techniques such as IEEE802.11g and IEEE802.11b. In the case of IEEE802.11g, the modulation technique is OFDM, which is the same as in IEEE802.11a. Therefore, in this aspect, transmission apparatus 20 can provide the stable packet transmission time period to reception apparatus 30, with the physical rate being fixed.

In addition, in the case of IEEE802.11b, DBPSK (Differential BPSK), DQPSK, and a technique diffusing a DQPSK signal with CCK (Complementary Code Keying) can be employed as the modulation technique. For these modulation techniques, four types of physical rates of 11 Mbps, 5.5 Mbps, 2 Mbps, and 1 Mbps can be selected. Therefore, in this case as well, transmission apparatus 20 can provide the stable packet transmission time period to reception apparatus 30, with the physical rate being fixed.

In the cases of IEEE802.11g and IEEE802.11b as well, all of other types of "jitter suppressed transmission" described in connection with IEEE802.11a can be similarly realized. In addition, switching between "jitter suppressed transmission" and "normal transmission" also can be similarly made.

[Example Where Communication Medium 40 is Adapted to Power Line Communication]

In yet another aspect, communication system 10 may employ power line communication (PLC) as communication medium 40. PLC includes several specifications, however, HomePlug (or HomePlugAV) will be described hereinafter.

In the case of HomePlug, in "jitter suppressed transmission", in transmitting a beacon or a management frame, an apparatus on a transmission side can select a transmission method called a ROBO mode for reliable transmission by setting the low physical rate. Transmission apparatus 20 according to this aspect may employ the ROBO mode in "jitter suppressed transmission". Alternatively, in an example where transmission apparatus 20 does not employ the ROBO mode, a transmission method with the physical rate being fixed may be employed as in IEEE802.11a.

An access control technique in HomePlug adopts the CSMA/CA technique as in wireless LAN. Detection of packet collision due to re-sending (ACK) is carried out. Back-off control also similarly exists. In the case of HomePlug however, a method of implementing prioritized QoS is somewhat different from that in wireless LAN. Specifically, a time period for transition of the channel from the busy state to the idle state is defined as a time period during which the channel is not used for a period of CIFS (Contention IFS) or longer. Thereafter, transition to a period called PRS (Priority Resolution Slot) is made. A terminal containing transmission data outputs a signal during the PRS period in accordance with the priority of the data to be transmitted. During the PRS period, each terminal can detect presence of other terminals having data of priority higher than that of the terminal itself. Only when a manager of the communication system (such as a communication controller having a master function) has determined as a result of detection that the terminal itself has data of the highest priority, the terminal can participate during the subsequent back-off period. Four types of priority of HomePlug are available, and priority is associated by using mapping equivalent to that shown in FIG. 11.

In HomePlugAV, as in TSPEC under IEEE802.11e, the communication controller having a master function can designate a condition for data transmission by each terminal, by providing a parameter group called CSPEC (Connection Specification) to each terminal configuring the communication system.

Moreover, communication system 10 according to this aspect can employ each method for suppressing jitter of the packet transmission time period ((1) to (12) above) also in an example complying with HomePlug (or HomePlugAV), as in the example where communication medium 40 complies with wireless LAN.

As to a method of switching between "jitter suppressed transmission" and "normal transmission", each manner can be implemented as in the example where IEEE802.11a is employed for communication medium 40.

[Example where Communication Medium 40 Employs Ethernet®]

In communication system 10 according to yet another aspect, when wired LAN such as Ethernet® is employed as communication medium 40, transmission apparatus 20 may employ each manner of (2), (4), (5), (6), (9), and (10) for suppressing jitter of the packet transmission time period in "jitter suppressed transmission".

In prioritized QoS control, priority of data is set in a VLAN (Virtual LAN) tag under IEEE802.1D (priority information in eight stages) and a TOS (Type of Service) field within IP (Internet Protocol) header.

In addition, when a router, a bridge (switching hub), or another relay apparatus is present on a path of communication medium 40 as well, a packet with priority is relayed preferentially, and hence prioritized QoS control is useful. Jitter of the packet transmission time period is thus suppressed.

In Ethernet®, the CSMA/CD (Collision Detection) technique is adopted as access control of the MAC layer. Where communication system 10 according to this aspect employs Ethernet® as communication medium 40, as back-off control as in CSMA/CD is carried out, transmission apparatus 20 can employ such a transmission method as setting the back-off time period shorter.

Moreover, in Ethernet®, the concept of the physical rate is not employed. Coding unit 201 in transmission apparatus 20 according to this aspect, however, can fix, or set low, the stream data coding rate in the "jitter suppressed transmission" state.

In communication system 10 employing Ethernet® as communication medium 40, with regard to switching between "jitter suppressed transmission" and "normal transmission", switching at the timing when transmission apparatus 20 receives a specific packet from reception apparatus 30 can be made in a manner similar to that described in connection with the example where communication medium 40 complies with IEEE802.11a.

Switching based on independent determination by transmission apparatus 20 at the timing when a certain predetermined time period has elapsed since start of "jitter suppressed transmission" shown in FIG. 4 or when a certain predetermined number of packets are transmitted can be made in a manner similar to that in the example complying with IEEE802.11a.

Under the communication specifications of Ethernet®, however, such specifications as returning ACK in the MAC layer are not employed. Accordingly, transmission apparatus 20 may not be able to detect disconnection of data communication with reception apparatus 30 with a method similar to that under IEEE802.11a. If TCP (Transmission Control Protocol) is used as the transport layer, ACK in the transport layer is returned by reception apparatus 30. Here, transmission apparatus 20 can detect the disconnection of data communication as in the example where communication medium 40 complies with IEEE802.11a.

On the other hand, when the transport layer employs UDP (User Datagram Protocol), reception apparatus 30 does not return ACK in the transport layer. Therefore, transmission apparatus 20 cannot detect disconnection of data communication based on ACK. Accordingly, when communication medium 40 complies with communication specifications where ACK is not returned, for example, transmission apparatus 20 may regularly carry out ping (Packet Internet Groper) to reception apparatus 30. Here, transmission apparatus 20 regards such a state that no response is returned from reception apparatus 30 as disconnection of data communication, and if this state continues for a predetermined period of time switching from "normal transmission" to "jitter suppressed transmission" is made. Alternatively, in communication system 10 according to this aspect, for example, transmission apparatus 20 and reception apparatus 30 may be adapted to a protocol comparable to ping in a UDP layer, so as to confirm presence of connection between transmission apparatus 20 and reception apparatus 30.

As described above in detail, according to communication system 10 of the embodiment of the present invention, transmission in which jitter of the packet transmission time period is suppressed is provided. Here, attention should be paid to the fact that direct parameter setting for this purpose is not provided for TSPEC under IEEE802.11e. Namely, though there is Minimum PHY Rate (minimum value of the physical rate), there is no Maximum PHY Rate (maximum value of the physical rate). In addition, though there is Delay Bound (allowable delay time)) there is no Delay Jitter Bound (allowable delay time jitter). Accordingly, in yet another aspect, a method of expanding an access point adapted to QoS and implementing a scheduler for transmission where jitter is suppressed may also be possible.

In communication system 10 according to the present embodiment, a method of suppressing jitter of the packet transmission time period in order to synchronize the system clock contained in reception apparatus 30 with the system clock of transmission apparatus 20 has been described. Reception apparatus 30 may employ other known techniques for synchronization. In addition, use of information on the packet transmission time period is not limited to use for synchronization of system clocks by reception apparatus 30, and reception apparatus 30 can use the information on the packet transmission time period also for other purposes.

It is not that transmission apparatus 20 according to the present embodiment is implemented only by the configuration shown in FIG. 2. Specifically, it is not that transmission apparatus 20 is implemented only by an operation of hardware such as combination of circuits for performing each process. In another aspect, a computer system including a memory storing a program providing a command and data and a processor executing a program based on the data can implement transmission apparatus 20. This is also applicable to reception apparatus 30.

Figure 13:
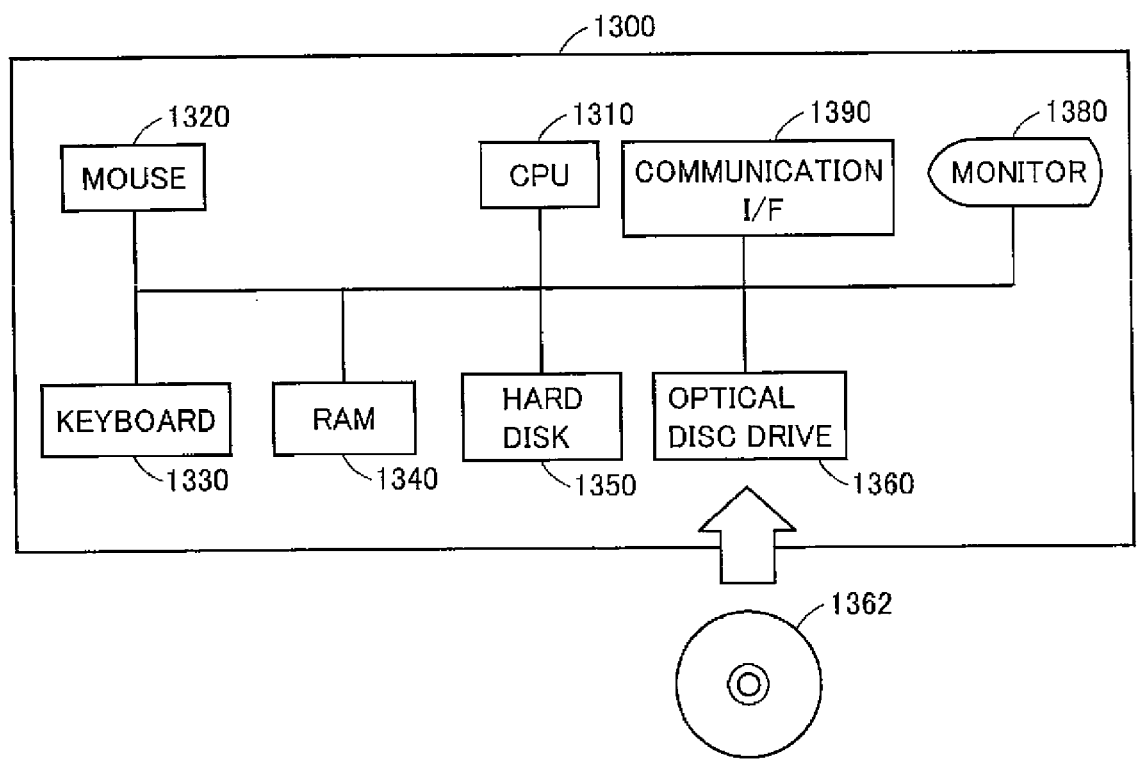
FIG. 13 is a block diagram showing a hardware configuration of a computer system 1300.

Referring now to FIG. 13, another manner of a specific configuration of transmission apparatus 20 or reception apparatus 30 according to the present embodiment will be described. FIG. 13 is a block diagram showing a hardware configuration of a computer system 1300 functioning as transmission apparatus 20 or reception apparatus 30.

Computer system 1300 includes, as main components, a CPU 1310 executing a program, a mouse 1320 and a keyboard 1330 accepting input of an instruction by the user of computer system 1300, a RAM 1340 storing, in a volatile manner, data generated as a result of execution of a program by CPU 1310 or data input via mouse 1320 or keyboard 1330, a hard disk 1350 storing data in a non-volatile manner, an optical disc drive 1360, a monitor 1380, and a communication I/F (Interface) 1390. Hardware is connected to each other via a data bus. A CD-ROM 1362 is mounted on optical disc drive 1360.

The processing in computer system 1300 is implemented by each piece of hardware and software executed by CPU 1310. Such software may be stored in hard disk 1350 in advance. Alternatively, software may be stored in CD-ROM 1362 or other storage media and distributed as a program product. Alternatively, software may be provided as a program product that can be downloaded by an information provider connected to what is called the Internet. Such software is read from the recording medium by optical disc drive 1360 or other reading devices, or downloaded through communication I/F 1390, and thereafter once stored in hard disk 1350. The software is read from hard disk 1350 by CPU 1310 and stored in RAM 1340 in the form of an executable program. CPU 1310 executes the program.

Hardware configuring computer system 1300 shown in FIG. 13 is general. Therefore, it can be said that the essential pair of the present invention resides in software stored in RAM 1340, hard disk 1350, CD-ROM 1362, or other recording media, or software that can be downloaded via a network. As the operation of each piece of hardware of computer system 1300 is well-known, detailed description will not be repeated.

It is noted that a recording medium is not limited to a CD-ROM, an FD (Flexible Disk), and a hard disk, and may be implemented as a medium securely carrying a program, such as a magnetic tape, a cassette tape, an optical disc (MO (Magnetic Optical Disc)/MD (Mini Disc)/DVD (Digital Versatile Disc)), an IC (Integrated Circuit) card (including a memory card), an optical card, a semiconductor memory such as a mask ROM, an EPROM (Electronically Programmable Read-Only Memory), an EEPROM (Electronically Erasable Programmable Read-Only Memory), and a flash ROM, and the like.

In addition, the program herein includes not only a program that can be directly executed by a CPU but also a program in a source program format, a program subjected to compression processing an encrypted program, and the like.

Although the present invention has been described and illustrated in detail, it is clearly understood that the same is by way of illustration and example only and is not to be taken by way of limitation, the scope of the present invention being limited only by the terms of the appended claims.

What is claimed is:

1. A communication apparatus communicating with a reception apparatus connected to a network, said communication apparatus, comprising:

a transmission unit configured to transmit packets in a plurality of asynchronous transmission modes realizing communication with said reception apparatus, said plurality of asynchronous transmission modes including a first transmission mode defined in advance as a standard mode of transmission by said communication apparatus, and a second transmission mode different from said first transmission mode, the second transmission mode being a jitter suppressed mode with lower packet arrival time jitter than packet arrival time jitter in the first transmission mode;

a transmission buffer unit configured to store a packet;

a determination unit configured to determine at least one of whether a prescribed period of time has elapsed since start of data transmission, whether a prescribed number of packets have been transmitted, and whether a specific packet has been received from said reception apparatus; and a selection unit configured to select one transmission mode from said plurality of transmission modes in accordance with a result of determination by said determination unit, wherein the transmission unit is configured to transmit the packet stored in said transmission buffer unit to said reception apparatus based on the transmission mode selected by said selection unit.

2. The communication apparatus according to claim 1, further comprising:

a reception unit configured to receive information from said reception apparatus; and a sensing unit configured to sense a request for transmission in accordance with said second transmission mode from the information received by said reception unit; wherein said selection unit is configured to select said second transmission mode in response to the sensing of said request.

3. The communication apparatus according to claim 1, further comprising:

a reception unit configured to receive information from said reception apparatus; and a sensing unit configured to sense a request for ending transmission in accordance with said second transmission mode from the information received by said reception unit; wherein said selection unit is configured to select said first transmission mode in response to the sensing of said request.

4. The communication apparatus according to claim 1, further comprising a sensing unit configured to sense powering-on of said transmission unit or a reset of said transmission unit; wherein said selection unit is configured to select said second transmission mode in response to the sensing by said sensing unit.

5. The communication apparatus according to claim 1, further comprising a sensing unit configured to sense lapse of a predetermined time period since start of transmission of the packet by said transmission unit or sense transmission of a predetermined number of packets; wherein said selection unit is configured to select said first transmission mode in response to the sensing by said sensing unit.

6. The communication apparatus according to claim 1, wherein
in said second transmission mode, said transmission unit transmits the packet with a physical rate being fixed, based on a communication characteristic defined in accordance with a type of said network.

7. The communication apparatus according to claim 1, wherein
in said second transmission mode, said transmission unit transmits the packet with a coding ratio and a modulation technique being fixed, based on a communication characteristic defined in accordance with a type of said network.

8. The communication apparatus according to claim 1, further comprising:
a reception unit configured to receive data from said reception apparatus; and
a request sensing unit configured to sense a request for re-sending of the packet by said transmission unit based on the data received by said reception unit; wherein
when said request sensing unit senses said request for re-sending, said transmission unit transmits said packet, and
in said second transmission mode, said transmission unit transmits the packet with a maximum number of times of packet re-sending being restricted, in accordance with a communication characteristic defined in accordance with a type of said network.

9. The communication apparatus according to claim 1, wherein
in said second transmission mode, said transmission unit transmits the packet with a value of a back-off time period, representing a waiting time from detection of non-use of carrier until transmission, greater than a value of the back-off time period used in the first transmission mode.

10. The communication apparatus according to claim 1, wherein
in said second transmission mode, said transmission unit transmits the packet in preference to best effort representing standard priority, based on a communication characteristic defined in accordance with a type of said network.

11. The communication apparatus according to claim 1, wherein
in said second transmission mode, said transmission unit secures a communication band and transmits the packet within said communication band, based on a communication characteristic defined in accordance with a type of said network.

12. The communication apparatus according to claim 1, wherein
in said second transmission mode, said transmission unit designates a parameter defining transmission quality of traffic and transmits the packet with a transmission method satisfying said transmission quality, based on a communication characteristic defined in accordance with a type of said network.

13. The communication apparatus according to claim 1, wherein
in said second transmission mode, said transmission unit transmits the packet with a maximum value of number of packets held by said transmission buffer unit being restricted.

14. The communication apparatus according to claim 1, further comprising:
a packet generation unit configured to packetize input data, wherein
in said second transmission mode, said transmission unit transmits the packet, with a packet length of the packet generated by said packet generation unit being shorter than a packet length of a packet generated for transmission in the first transmission mode.

15. The communication apparatus according to claim 14, wherein
in said second transmission mode, said transmission unit transmits the packet, with the packet generated by said packet generation unit being provided with an error correction code.

16. The communication apparatus according to claim 1, further comprising:
a coding unit configured to code stream data, wherein
in said second transmission mode, said transmission unit transmits the coded stream data with a coding rate lower than a coding rate used for the first transmission mode.

17. The communication apparatus according to claim 1, wherein
a packet generation unit generates a packet including at least a time stamp indicating time when the packet was generated by the packet generation unit.

18. The communication apparatus according to claim 1, wherein
in said second transmission mode, said transmission unit carries out transmission with a frame interval being smaller than a frame interval used in the first transmission mode, the frame interval representing a minimum interval between signals to be sent, from detection of non-use of carrier until transmission of the signal.

19. The communication apparatus according to claim 1, wherein
in said second transmission mode, said transmission unit transmits said packet to said network with multicast transmission or broadcast transmission.

20. A non-transitory computer-readable recording medium encoded with instructions, wherein the instructions when executed by a computer cause the computer to function as a communication apparatus communicating with a reception apparatus connected to a network, said computer including a processor executing said instructions, and a memory, and realizing communication with said reception apparatus by transmitting packets in a plurality of asynchronous transmission modes, said plurality of asynchronous transmission modes including a first transmission mode defined in advance as a standard mode of transmission by said computer and a second transmission mode different from said first transmission mode, said second transmission mode being a jitter suppressed mode with lower packet arrival time jitter than packet arrival time jitter in the first transmission mode, said instructions causing said computer to perform a method, comprising:

determining at least one of whether a prescribed period of time has elapsed since start of data transmission, whether a prescribed number of packets have been transmitted, and whether a specific packet has been received from said reception apparatus;

selecting one transmission mode from said plurality of asynchronous transmission modes in accordance with a result of the determining;

temporarily holding a packet in said memory; and transmitting the packet temporarily held in said memory to said reception apparatus based on the selected transmission mode.

* * * * *